(12) United States Patent
Hagen et al.

(10) Patent No.: US 12,151,733 B2
(45) Date of Patent: Nov. 26, 2024

(54) PHYSICAL SHOPPING CART HAVING FEATURES FOR USE IN CUSTOMER CHECKOUT OF ITEMS PLACED INTO THE SHOPPING CART

(71) Applicant: Target Brands, Inc., Minneapolis, MN (US)

(72) Inventors: Todd A. Hagen, Shakopee, MN (US); Josh Michael Dingman, Minneapolis, MN (US); Daniel Woods, Brooklyn Park, MN (US); Donnie Tolbert, Carver, MN (US); Andrew Wipf, Minneapolis, MN (US); Tomas Kadlec, Minneapolis, MN (US); Donald John Armstrong, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 18/454,120

(22) Filed: Aug. 23, 2023

(65) Prior Publication Data
US 2023/0391390 A1 Dec. 7, 2023

Related U.S. Application Data

(63) Continuation of application No. 17/345,951, filed on Jun. 11, 2021, now Pat. No. 11,772,696, which is a
(Continued)

(51) Int. Cl.
*B62B 5/00* (2006.01)
*B62B 3/14* (2006.01)

(52) U.S. Cl.
CPC .......... *B62B 5/0096* (2013.01); *B62B 3/1416* (2013.01); *B62B 3/1424* (2013.01)

(58) Field of Classification Search
CPC .................................................... B62B 5/0096
(Continued)

(56) References Cited

U.S. PATENT DOCUMENTS

| 4,071,740 A | 1/1978 | Gogulski |
| 5,361,871 A | 11/1994 | Gupta et al. |

(Continued)

OTHER PUBLICATIONS

Geekwire.com [online], "How 'Amazon Go' works: The technology behind the online retailer's groundbreaking new grocery store," Dec. 5, 2016, [retrieved on Jul. 20, 2017], retrieved from : URL <https://www.geekwire.com/2016/amazon-go-works-technology-behind-online-retailers-gro>, 10 pages.

(Continued)

*Primary Examiner* — Rafferty D Kelly
(74) *Attorney, Agent, or Firm* — Barnes & Thornburg LLP

(57) ABSTRACT

Physical shopping carts can have product detection systems and associate physical shopping carts with mobile computing devices (e.g., smartphones, tablet computing devices, smart watches, wearable computing devices). For example, physical shopping carts can be equipped with one or more product detection systems (e.g., scanners, sensors, cameras) that can electronically tally products that are placed in physical shopping carts. Mobile computing devices can be associated with and mounted on the physical shopping carts to provide a variety of enhanced shopping cart features not possible with conventional physical shopping carts, such as electronically tracking the contents of a shopping cart, checking-out from the mobile computing device (instead of at conventional check-out areas, such as point of sale terminals), and others.

20 Claims, 18 Drawing Sheets

Related U.S. Application Data continuation of application No. 16/593,837, filed on Oct. 4, 2019, now Pat. No. 11,059,506.

(60) Provisional application No. 62/741,216, filed on Oct. 4, 2018.

(58) Field of Classification Search
USPC .................................................. 340/568.5
See application file for complete search history.

(56) References Cited

U.S. PATENT DOCUMENTS

| | | |
|---|---|---|
| 5,729,697 A | 3/1998 | Schkolnick et al. |
| 5,773,954 A | 5/1998 | VanHorn |
| 5,939,695 A | 8/1999 | Nelson |
| 6,032,127 A | 2/2000 | Schkolnick et al. |
| 6,484,939 B1 | 11/2002 | Blaeuer |
| 6,928,343 B2 | 8/2005 | Cato |
| 6,997,382 B1 | 2/2006 | Bhri |
| 7,225,980 B2 | 6/2007 | Ku et al. |
| 7,741,808 B2 | 6/2010 | Fowler et al. |
| 7,934,647 B1 | 5/2011 | Mims et al. |
| 8,120,190 B2 | 2/2012 | Bravo |
| 2004/0111320 A1 | 6/2004 | Schlieffers et al. |
| 2008/0122227 A1 | 5/2008 | Hammerle |
| 2008/0243626 A1 | 10/2008 | Stawar et al. |
| 2009/0058357 A1 | 3/2009 | Saker et al. |
| 2009/0231135 A1 | 9/2009 | Chaves et al. |
| 2010/0262554 A1 | 10/2010 | Elliott |
| 2011/0084659 A1 | 4/2011 | Neiemann et al. |
| 2012/0049539 A1 | 3/2012 | Sanvik |
| 2014/0350710 A1 | 11/2014 | Gopalakrishnan et al. |
| 2014/0350715 A1 | 11/2014 | Gopalakrishnan et al. |
| 2015/0012396 A1 | 1/2015 | Puerini et al. |
| 2015/0019391 A1 | 1/2015 | Kumar et al. |
| 2016/0260161 A1 | 9/2016 | Atchley et al. |
| 2017/0076354 A1 | 3/2017 | High et al. |
| 2018/0197218 A1* | 7/2018 | Mallesan ............. G07G 1/0054 |
| 2018/0218351 A1 | 8/2018 | Chaubard et al. |

OTHER PUBLICATIONS

Hellenschmidt & Kamieth, "BERNIE—Consultant for Nutrition and Intelligenct Shopping."Communications in Computer and Information Science, 2007, 11:28-239.

Lauzon et al., "Point Of Sale Grocery Cart," Michigan State College of Engineering, 2014, 69 pages.

rfidarena.com [online], "RFID shopping-cart level checkout is possible with technology that is available today, "[retrieved on Jul. 20, 2017], retrieved from : URL <http://www.rfidarena.com/2014/5/15/rfid-shopping-cart-level-checkout-is-possible-with-te/>, 12 pages.

Tesco.com [online], "Scan as you Shop, "[retrieved on Jul. 20, 2017], retrieved from : URL <https://www.tesco.com/scan-as-you-shop/>, 7 pages.

* cited by examiner

PHYSICAL SHOPPING CART HAVING FEATURES FOR USE IN CUSTOMER CHECKOUT OF ITEMS PLACED INTO THE SHOPPING CART

CROSS-REFERENCE TO RELATED APPLICATIONS

This application is a continuation of U.S. application Ser. No. 17/345,951 filed on Jun. 11, 2021, which is a continuation of U.S. application Ser. No. 16/593,837 filed on Oct. 4, 2019 and issued on Jul. 13, 2021 as U.S. Pat. No. 11,059,506, which claims the benefit of U.S. Provisional Application Ser. No. 62/741,216, filed Oct. 4, 2018. The disclosures of the prior applications are considered part of and are incorporated by reference in the disclosure of this application.

TECHNICAL FIELD

This document generally relates to physical shopping carts that are used in physical retail stores and other shopping establishments, and to the association of mobile computing devices with such physical shopping carts.

BACKGROUND

Physical shopping charts have been used in retail stores and a variety of other shopping establishments (e.g., grocery stores, home improvement stores) to provide customers with a way to collect and transport items to a checkout area (e.g., point of sale terminal, cashier). Although physical shopping carts have a variety of different form factors and configurations, physical shopping carts generally include a frame, an area for the placement of items (e.g., basket, bin, platform), and a handle or other mechanism for customers to move the cart around. Physical shopping carts can include wheels on which the frame is mounted to permit the cart to be pushed around a store. Alternatively, physical shopping carts can include a handle or other mechanism permitting users to carry carts around a store.

SUMMARY

This document generally describes technology for providing physical shopping carts with product detection systems and associating physical shopping carts with mobile computing devices (e.g., smartphones, tablet computing devices, smart watches, wearable computing devices). For example, physical shopping carts can be equipped with one or more product detection systems (e.g., scanners, sensors, cameras) that can electronically tally products that are placed in physical shopping carts. Mobile computing devices can be associated with and mounted on the physical shopping carts to provide a variety of enhanced shopping cart features not possible with conventional physical shopping carts, such as electronically tracking the contents of a shopping cart, checking-out from the mobile computing device (instead of at conventional check-out areas, such as point of sale terminals), and others.

In order to provide the user with a convenient way to use their mobile device while using the shopping cart, the cart can include a mounting area into which the mobile computing device can be mounted. This mounting can allow the user to view and interact with the mobile device while shopping. For example, the user may place an item into the cart, which is then detected by the cart. The cart can communicate this placement to the mobile computing device, which can then update a shopping application with the placement. The placement can trigger an update to the mobile computing device's display, which can be seen by the user as the mobile computing device is mounted in the mounting area.

The cart can have further features that are useful in this scenario. For example, a bag dispenser may be affixed within the shopping cart so that, as the user shops and places items in the cart, the user can place them in an open back in the bag dispenser within the cart. This can result in advantageously allowing the user to bag their own items as they shop with no more effort than placing items in the cart, reducing the effort needed to complete a shopping trip.

In one implementation a physical shopping cart is configured to transport physical goods around a store. The physical shopping cart includes a basket having an entrance area and a containment area into which the physical goods can be placed by passing the physical goods through the entrance area; a handle by which a user can push the physical shopping cart around the store; and a first mounting fixture into which the user can removably mount a mobile computing device in an orientation that causes a display of the mobile computing device to be viewable by the user as the user pushes the handle to push the physical shopping cart around the store.

Implementations can include some, none, or all of the following features. The first mounting fixture is positioned between the handle and the basket. The orientation is generally horizontal. The orientation is within ten degrees of horizontal. The physical shopping cart further comprises a controller device that comprises a computer processer and data transceiver, the controller device configured to communicably couple with the mobile computing device; and communicate with a communicably coupled mobile computing device to provide the mobile computing device with information about a shopping experience in the store using the physical shopping cart. The controller device is installable coupled to the physical shopping cart. The controller device is integral a permanent structure of the physical shopping cart. The physical shopping cart includes a second mounting fixture into which the user can removably mount a scanner that is configured to scan barcodes of the physical goods and transmit information about the physical goods to the mobile computing device. The physical shopping cart is configured to sense when physical goods are placed in the basket; and wherein the physical shopping cart is configured to transmit information about the physical goods to the mobile computing device.

In one implementation a physical shopping cart is configured to transport physical goods around a store. The physical shopping cart includes a basket having an entrance area and a containment area into which the physical goods can be placed by passing the physical goods through the entrance area; a handle by which a user can push the physical shopping cart around the store; and one or more gesture sensors configured to sense gestures passing physical goods through the entrance area when physical goods are placed in the basket; and wherein the physical shopping cart is configured to transmit information about the physical goods to the mobile computing device.

Implementations can include some, none, or all of the following features. To sense when physical goods are placed in the basket, the physical shopping cart further comprises a computer-vision sensor configured to capture computer-images of physical goods passing through the entrance area. The basket comprises a main area and an auxiliary area separated by partition, the main area includes at least two sensor pairs that are positioned at different locations within the main area, wherein each of the at least two sensor pairs includes at least one gesture sensor and at least one computer-vision sensor, and the auxiliary area includes at least one sensor pair including at least one gesture sensor and at least one computer-vision sensor. A first sensor pair in the main area is positioned along a side of the main area with a first vantage point directed laterally across the main area of the cart, and a second sensor pair in the main area is positioned in an opposing corner of the main area of the cart with a second vantage point directed diagonally across the main area toward and partially overlapping a field of view of the first sensor pair. A sensor pair in the auxiliary area is positioned along a side of the auxiliary area with a vantage point directed laterally across the auxiliary area of the cart. An undercart area that is positioned below the basket, the undercart area including a shelf that is configured to hold goods, an undercart sensor pair that is affixed to an underside of the basket with a vantage point directed downward toward the undercart area. The undercart sensor pair is affixed to the underside of the basket at a front of the shopping cart and the vantage point is directed down and toward a back of the shopping cart. The undercart sensor pair is affixed to the underside of the basket at a back of the shopping cart and the vantage point is directed down and toward a front of the shopping cart. The cart includes an RFID sensor that is affixed to the underside of the basket; and a controller device that is configured to receive sensed information from the gesture sensor, the computer-vision sensor, the RFID sensor, and combinations thereof, and to identify products that are currently contained within the shopping cart based on the sensed information, wherein the controller device is affixed to an underside of the shelf for the undercart area. The basket comprises a main area and an auxiliary area separated by a movable partition, and wherein the physical shopping cart further comprises a first sensor and a second sensor; wherein: with the movable partition in a first position, the first sensor senses activity in the main area while the second sensor senses activity in the auxiliary area; and with the movable partition in a second position, the first sensor senses activity in the main area while the second sensor senses activity in the main area. The cart includes a bag rack within the containment area.

The systems, devices, program products, and processes described throughout this document can, in some instances, provide one or more of the following advantages. A shopping cart can provide a user with tools to track items placed in the cart. This can allow a user to advantageously manage a shopping session using a mobile computing device such as their mobile phone. The user can then complete a purchase of all items in the cart without the time and effort needed to unload the cart at a cash register. This technology can be used to improve the efficiency and user experience in a physical store during a shopping experience. A bag dispenser inside of a cart can allow for a quicker and easier bagging workflow in shopping sessions in which items do not need to be scanned at a cash register. Other features, aspects and potential advantages will be apparent from the accompanying description and figures.

DESCRIPTION OF DRAWINGS

Like reference symbols in the various drawings indicate like elements

DETAILED DESCRIPTION

This document describes a physical shopping cart having features for use in customer checkout of items placed into the shopping cart. For example, the shopping cart may have hardware for scanning or detecting physical goods placed into the shopping cart, hardware for transmitting information about those physical goods to a mobile computing device, and hardware for mounting the mobile computing device to the physical shopping cart.

For example, the physical shopping cart may include a mounting fixture positioned between the handle of the cart and the basket. This mounting fixture may include elements into which the user can removably mount their mobile computing device (e.g., cell phone, tablet). This mobile computing device may be paired with the physical shopping cart in order to be used in a customer-lead purchase session in which the customer picks out physical goods that are scanned or detected by the shopping cart as the customer selects and places the physical goods into the physical shopping cart.

For example, the physical shopping cart can include hardware to allow the user to scan physical items as they are selected and placed into the physical shopping cart. This hardware can include, for example, a handheld scanning device that the user can use to can use to scan barcodes of physical goods being selected. The scanner can transmit information about the selected item to a computing device (e.g., a mobile computing device, a computing device on the physical shopping cart) with information about the scanned physical good in order to add that physical good to a logical shopping cart that tracks what has been scanned.

For example, the physical shopping cart can include hardware that detects physical items being placed in the cart. This can include, for example, gesture sensors that sense gestures when the physical item crosses a sensor plane on an entrance area of the cart. This can also or alternatively include computer vision sensors, radio frequency identification (RFID) sensors, etc. This can enable sensing of items placed into the cart without additional special activities or input by the user. The hardware can then transmit information about the selected items to a computing device to be added to a logical shopping cart that tracks physical items in the physical shopping cart.

For example, the physical shopping cart can include a bag dispenser containing shopping bags (e.g., so-called t-shirt bags, reusable bags). This rack can hold the bag within a basket portion of the physical shopping cart so that, when a user is placing items into the physical shopping cart, those items can be placed directly into the bag in which the user will later carry the physical good. This can be particularly beneficial, for example, in instances in which the user does not need to remove items from the physical shopping cart in order to process a purchase transaction for the physical items in the physical shopping cart.

Figure 1:
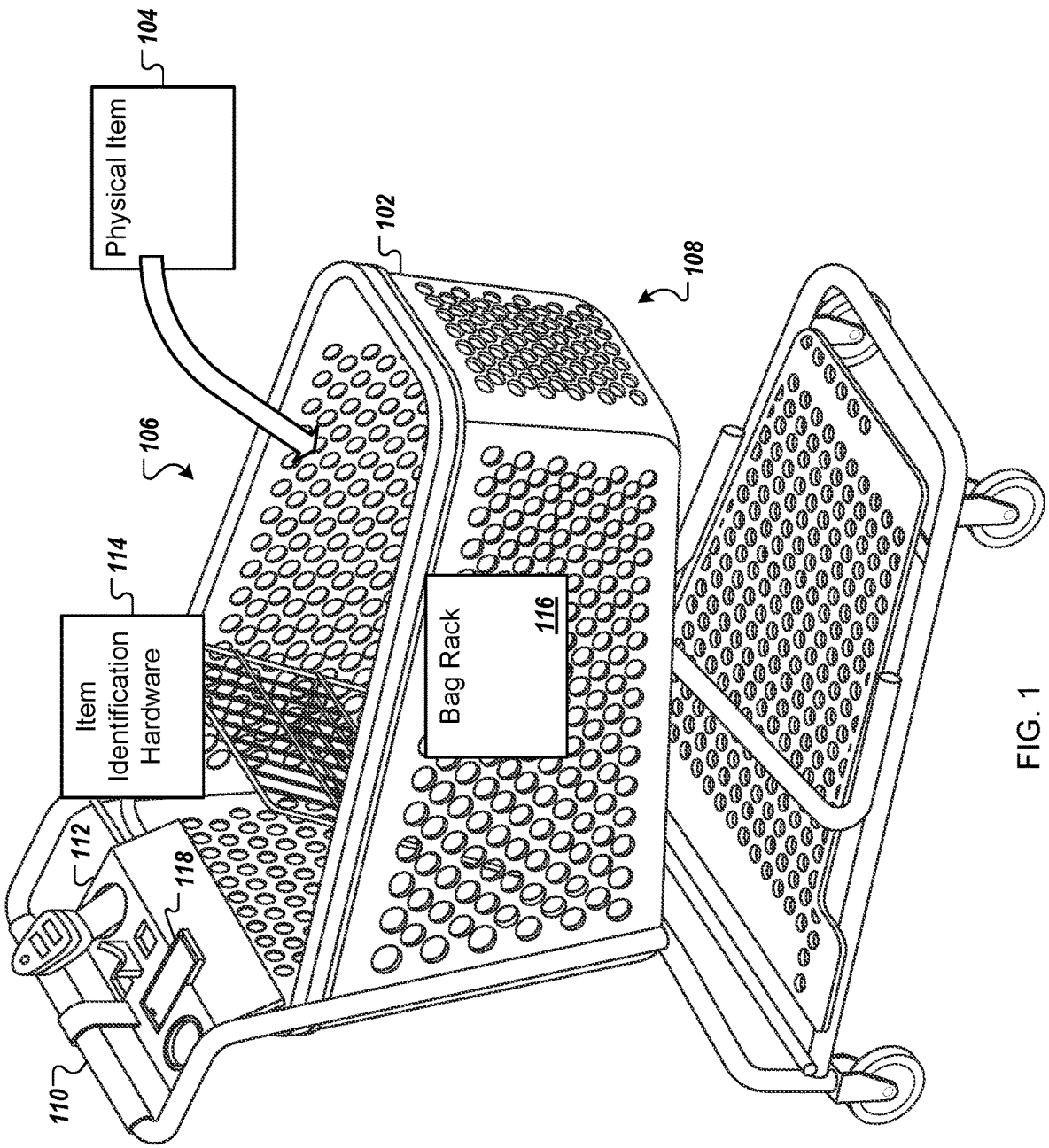
FIG. 1 is a diagram of an example physical shopping cart having features for use in customer checkout of items placed in the shopping cart.

FIG. 1 is a diagram of an example physical shopping cart 100 having features for use in customer checkout of items placed in the shopping cart. For example, the physical shopping cart 100 can include a basket 102 into which physical items 104 can be placed. For example, as a user (e.g., a shopper) walks around a store with the physical shopping cart 100, the use may select physical items 104 (e.g., items on shelves sold by the store) and may place the physical items 104 into the basket 102 so that they are conveniently transported with the user as they walk through the store.

When placing the physical items 104 into the physical cart 100, the physical item 104 can pass through an entrance area 106 of the basket 102. In general, the entrance area 106 can include the area at the mouth, lip, or other ingress area of the basket 106. Once past the entrance area 106, the physical item 104 can rest in the containment area 108 of the physical cart 102. The containment area 108 may include area or areas inside the basket 102 past the entrance area 106. In this example, the containment area 108 includes area adjacent to the bottom and sidewalls of the basket 102. However, as will be understood, different configurations of the basket 102 can produce different entrance areas and different containment areas.

A handle 110 includes hardware configured to receive a user's handhold for the purpose of propelling the physical shopping cart 100. In many cases, the handle 110 is rigidly coupled to the basket 108 or other structure of the physical shopping cart 100 so that, as the user applies force to the handle, the force is transmitted to the physical shopping cart 100 in order to move the physical shopping cart.

One or more mounting fixtures 112 may be included in the physical shopping cart 110. The mounting fixture 112 can be configured to removably mount one or more devices onto the physical shopping cart 110. For example, a mounting fixture 112 may be configured to hold a mobile computing devices such as a phone for the user as the user is pushing the physical shopping cart 100. In this way, the user may advantageously be able to see the screen of the mobile computing device as the user is shopping without having to hold the mobile computing device with hands that can be used for shopping tasks (e.g., placing a physical item 104 into the basket 102.) In another example, a physical shopping cart may have one or more other mounting fixtures in order to mount, for example, a hand-held scanner, a water bottle, a loyalty card, etc. The shape of the mounting fixture 112 can be configured based on the type of device to be mounted. For example, a mounting fixture 112 to hold a mobile computing device may have generally straight surfaces in a shape that holds a mobile computing device without significant movement. Example mounting fixtures of different shapes are described in greater detail below.

In this example, the mounting fixture 112 is positioned between the handle 110 and the basket 102. This positioning may advantageously keep the mobile computing device near enough the user that they can clearly see the display and the contents of the cart from a single view behind the cart, which is where many users will be positioned when pushing with the handle 110.

The mounting fixture 112 may be oriented in order to hold a mobile computing device in a particular orientation. For example, the mounting fixture may be rigid or adjustable in order to control the orientation of the display of a mounted mobile computing device. In one implementation, the mounting fixture 112 may be configured hold the display of the mobile computing device horizontal or generally horizontal (e.g., within two degrees of horizontal). This can allow, for example, a user to be able to read the display from any point around the physical shopping cart 100. In one implementation, the mounting fixture can hold the mobile computing device so that the display is within 10 degrees of horizontal. This can allow, for example, a user to easily see the display when pushing on the handle 110 while also allowing the user to be able to see the display from any point around the physical shopping cart 100.

Item selection hardware 114 can include computer and electronic hardware that is configured to identify physical items 104 that are placed in the physical shopping cart 100. This can include, for example, sensors, data processors, computer memory, and data transceivers that can work with the mobile computing device mounted in the mounting fixture 112. For example, the mobile computing device 112 can run a shopping application that manages a shopping session for the user. As the user selects physical items 104 and scans the physical items 104 and/or places the physical items 104 into the physical shopping cart 100, the item detection hardware 114 can send messages to the mobile computing device with details about the physical items 104. In some cases, elements of the item detection hardware 114 are installable onto the cart. For example, after-market item detection hardware may be latched, bolted, or otherwise installed onto a physical shopping cart 100 after the physical shopping cart 100 is manufactured. In some cases, elements of the item detection hardware 114 are integral to the physical shopping cart. For example, the item detection hardware 114 may be positioned within the frame of the physical shopping cart 100 as part of manufacturing the physical shopping cart 100.

The item detection hardware 114 can pair with a mobile computing device. For example, the mobile computing device may run a shopping application that is published by the store or other organization that provides the physical shopping cart 110. The mobile computing device may execute a pairing routine to pair with the physical shopping cart 110 though the exchange of data. In one example, an element of the physical shopping cart (e.g. a surface of the basket 102, a surface of a hand-scanner) may contain a barcode code, which can be scanned by the mobile computing device. In another example, the mounting fixture may include a wire or plug-in dock to exchange data. In another example, the application on the mobile device may display a barcode such as a barcode to be scanned by the item detection hardware 114.

The physical shopping cart 100 may include a bag dispenser 116 to hold bags within the basket 108. As the user places the physical items 104 into the physical shopping cart 100, the user may place the physical items into a bag of the bag dispenser 116. This may allow the user to bag the physical items 104 as they are selected. Then, because their purchase can occur without the need to unload and scan the physical items at a cashier's station at the end of the shopping session, the user may remove all purchased physical items 104 in bags. This may advantageously reduce the effort and number of actions needed after a purchase is completed.

Figure 2A:
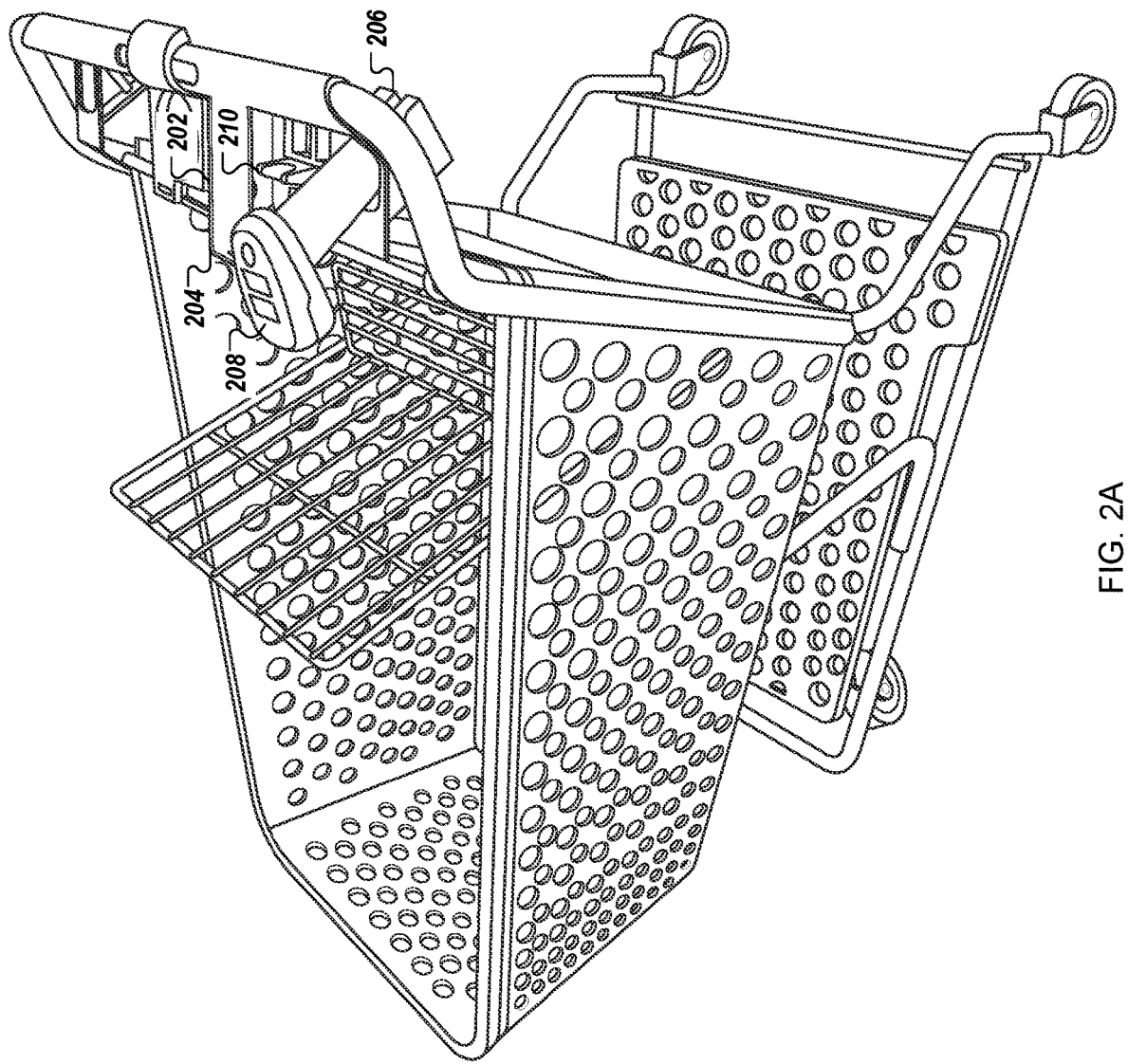
FIGS. 2A and 2B are examples of a physical shopping cart having a mounting fixture for mounting a mobile computing device and a scanner.
Figure 2B:
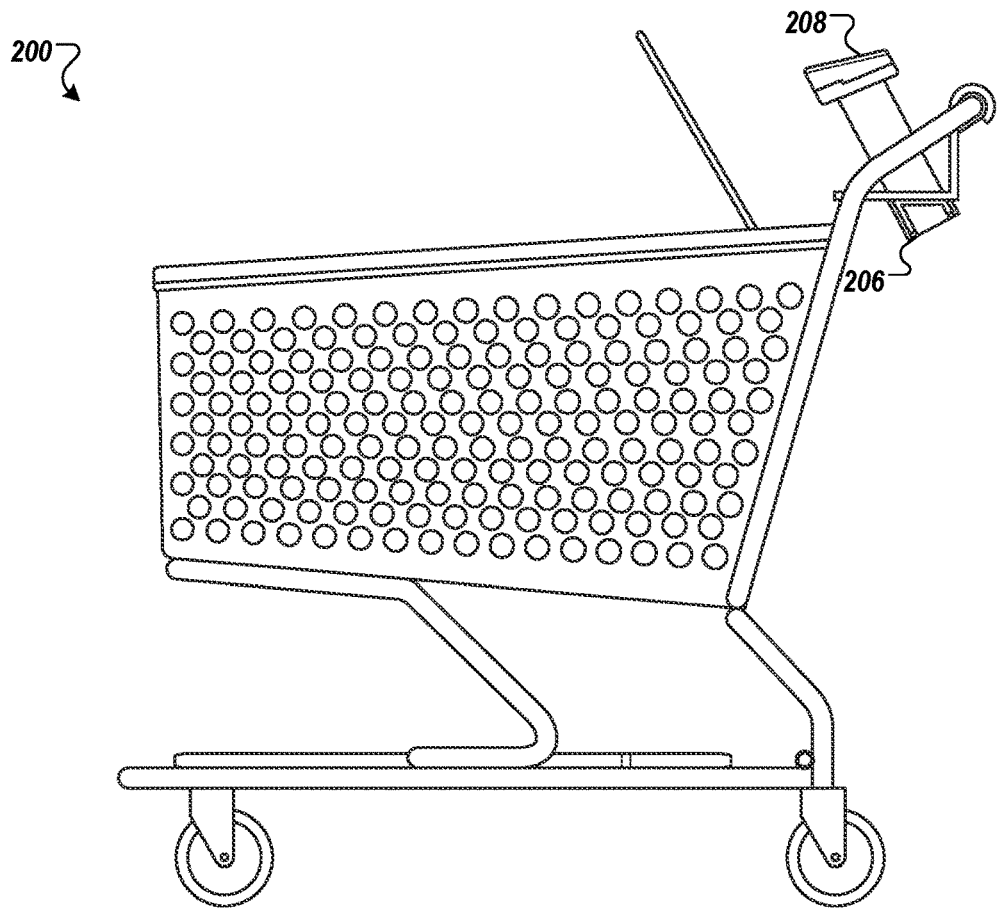
Figure 2B:
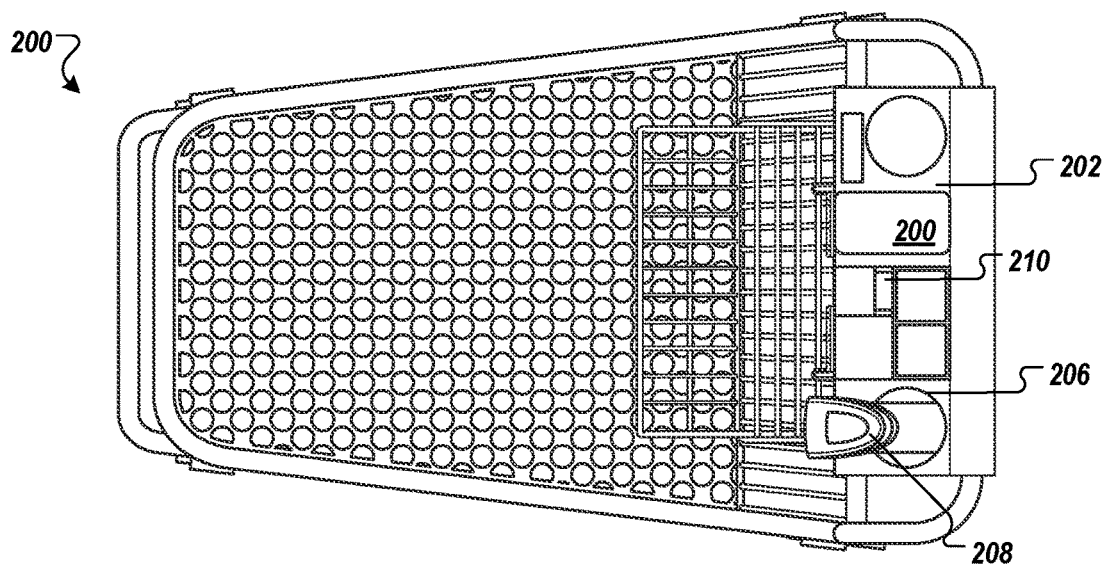

FIGS. 2A and 2B are examples of a physical shopping cart 200 having a first mounting fixture 202 for mounting a mobile computing device 204 and a second mounting fixture 206 for mounting a handheld scanner 208.

The physical shopping cart 200 can be used in a retail environment and allow a user to scan physical items with the handheld scanner 204 as the user selects the physical items for purchase. For example, a user may push the physical shopping cart 200 around a store, perusing the items on shelves for sale. The user may then pick up an item they are interested in. The user may then unmount the handheld scanner 208 from the second mounting fixture 206 and scan the physical item with the handheld scanner 208. After this scanning, the user can place the physical item into the physical cart 200, for example in the basket or on a lower shelf of the physical cart 200. After the handheld scanner 208 scans the item (e.g., reading a barcode by emitting one or more lasers and sensing their reflection), the handheld scanner 208 can transmit a message to the mobile computing device 204 about the scanning event. The mobile computing device 204 may, for example, update a graphical user display that shows information about the physical item in an application, website, etc. As shown here, the mobile computing device 204 is removably mounted in the mounting fixture 202. As such, the user is able to see the update to the mobile computing device's 204 display from any position around the physical shopping cart 200. This can include from the sides or front of the cart while placing the physical item into the physical shopping cart 200, or from behind the physical shopping cart 200 when holding the handle of the physical shopping cart.

In some examples, physical shopping carts can include other mounting fixtures. For example, the physical shopping cart 200 can include an auxiliary mounting fixture 208 configured to removably mount a cup. In this example shown, a cup holder is positioned between the handle and the basket of the cart to allow the user to place and remove a cup in the auxiliary mounting fixture 208 while shopping. For example, the physical shopping cart 200 can include an auxiliary mounting fixture 210 configured to removably mount a bottle of water. In this example shown, a water-bottle bracket is positioned between the handle and the basket of the cart to allow the user to place and remove a bottle of water in the auxiliary mounting fixture 210 while shopping.

Figure 3A:
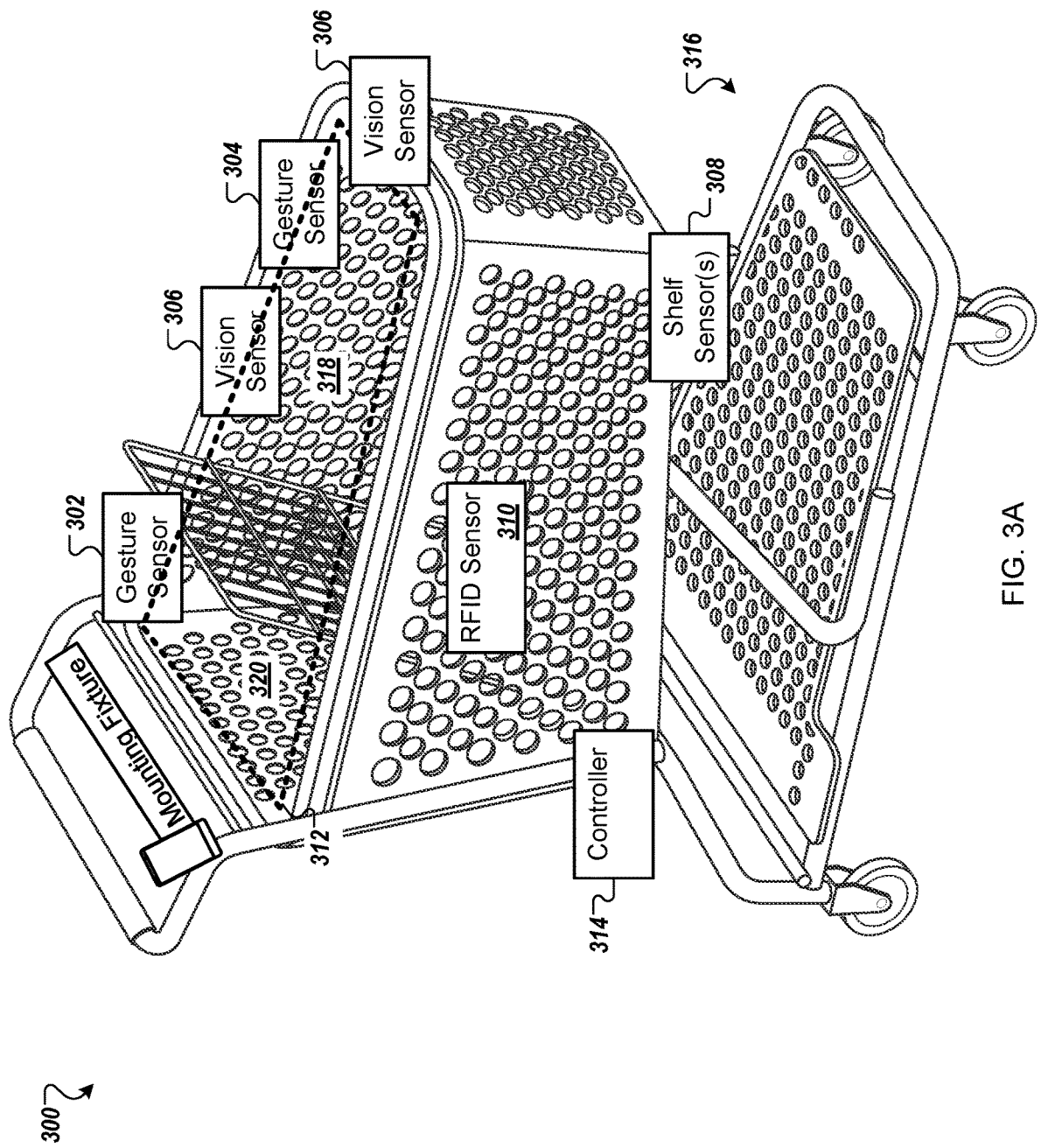
FIGS. 3A and 3B are examples of a physical shopping cart having sensors to automatically detect items placed in the shopping cart.
Figure 3B:
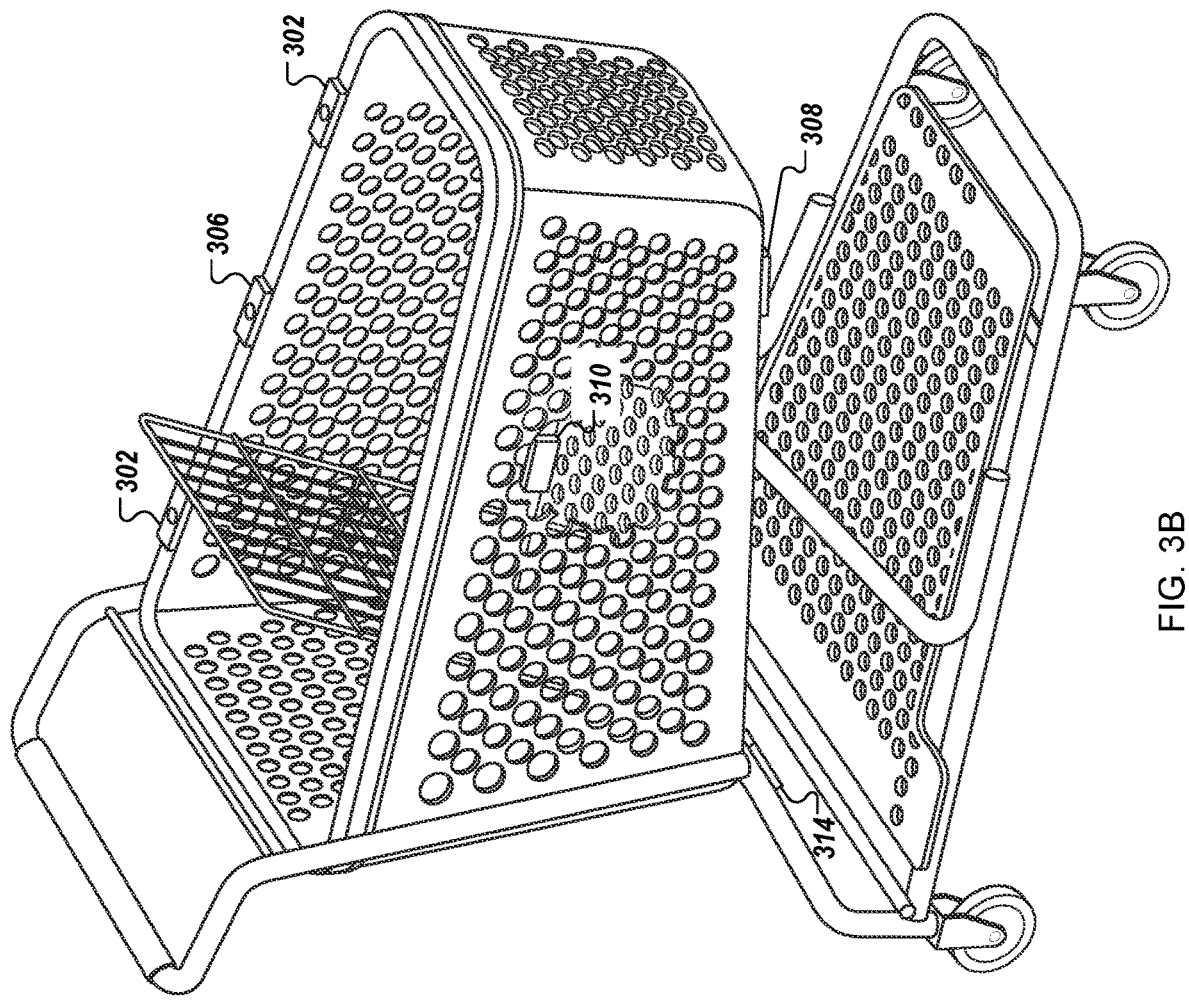

FIGS. 3A and 3B are examples of a physical shopping cart 300 having sensors to automatically detect items placed in the shopping cart. For example, the physical shopping cart 300 can include gesture sensors 302 and 304, a vision sensor 306, a shelf sensor 308, and/or a radio frequency identification (RFID) sensor 310, all in communication with a controller 314.

The physical shopping cart 300 can be used in a retail environment and automatically identify physical items placed into the physical shopping cart by users. For example, a user may push the physical shopping cart 300 around a store, perusing the items on the shelves for sale. The user may then pick up an item they are interested in and place it in the physical shopping cart 300.

Some or all of the sensors 302-310 can create a sensor plane 312 in the entrance area of the basket of the physical shopping cart 300. This sensor plane describes a plane that is within the sensing area of at least one of the sensors 302-310 where the identity of a passing physical item can be determined. When the user passes a physical item through the entrance area of the basket, the physical item passes through the sensor plane 312. The sensors 302-310 can sense this event and transmit data of the event to the controller 314. The controller 314 may then process the data and determine what kind of physical item was placed into the basket of the physical cart 300. Then, the controller 314 can process this placement, for example by updating a logical shopping cart or sending a message to a paired mobile computing device.

This sensing can be performed without any particular input. For example, the sensors 302-310 can be configured and/or positioned so that, as a user undertakes natural, instinctive, and/or traditional actions used to place physical items into the physical shopping cart 300, the sensors are able to capture this phenomena such that they can identify the placement and/or identify the item that was placed into the physical shopping cart 300.

For example, gesture sensors 302 and/or 304 may detect the movement of the users hand and/or the movement of the physical item through the sensor plain 312. In some implementations, the gesture sensors 302 and/or 304 may include proximity sensors, distance sensors, tripline (e.g. laser) sensors, etc. The gesture sensors 302 and/or 304 can include hardware capable of discerning the direction of a gesture. For example the gesture sensors 302 and/or 304 may be able to sense, or provide data to e.g., the controller 314 so the controller 314 can determine, the direction of a physical item moving through the sensor plain 312.

A vision sensor can capture computer vision (e.g., still image or images, video data) of physical items, user hands, or other objects passing through the sensor plain 312. In some implementations, the vision sensor 308 can include an image sensor such as a complementary metal oxide semiconductor (CMOS) sensor or a charged couple device (CCD). In some cases, the vision sensor 308 can be configured to only engage in response to a gesture sensor 302 and/or 304 detecting a gesture. Such a configuration may advantageously reduce the amount of time the vision sensor 306 is engaged in a shopping session. In some cases, the vision sensor 308 can be engaged at all times. This can advantageously ensure that any item to pass through the sensor plain 312 is captured with computer vision for, e.g., identification purposes.

The RFID sensor can capture an RFID identifier for physical items having RFID tags. In some implementations, the RFID sensor can include a field generator and a field sensor that examines the field for disturbances caused by RFID tags. In some cases, the RFID sensor can be configured to only engage in response to a to a gesture sensor 302 and/or 304 detecting a gesture. Such a configuration may advantageously reduce the amount of time the RFID sensor is engaged in a shopping session. In some cases, the RFID sensor 310 can be engaged at all times. This can advantageously ensure that any item to pass through the sensor plane 312 is captured with RFID sensing, e.g., for identification purposes.

In some cases, the physical shopping cart 300 can include both a vision sensor 308 and a RFID sensor 310. For example, a particular store may sell durable goods that are expected to always have a mostly consistent appearance. For example, rigid plastic boxes and paper cartons are likely to maintain their shape through shopping sessions, stocking activities, etc. These consistent physical goods can be sensed using the vision sensor 308 as the vision sensor and/or controller 314 can be trained on their consistent appearance. In addition, the store may also sell goods that are likely to have inconsistent appearances. Fresh produce, bulk items apportioned out by the customer, and soft-goods (e.g., clothing, linens) can all be expected to change shape and/or appearance. As such, the store may tag these physical items (but not, e.g., the consistent physical items) with RFID tags. Such a scheme may allow for reliable item identification while maintaining a lower cost and complexity than a scheme involving the tagging of every item including consistent physical items.

The physical shopping cart 300 can include a shelf sensor 308 configured and positioned to identify items placed on a lower shelf 318. The shelf sensor can include gesture sensing hardware, vision sensing hardware, and/or RFID sensing hardware. In some cases, a single RFID sensor 310 can be used to sense RFID tags anywhere in the physical shopping cart 300.

In some cases, the physical shopping cart 300 can include a basket having a main area 318 and an auxiliary area 320 separated by a movable partition. For example, the main area 318 may be larger and intended to hold larger physical items, while the auxiliary area 320 may be intended to hold a child, smaller/delicate items, contaminates such as raw meat that should be sequestered from other food items, etc. A movable partition can be movably affixed to the physical shopping cart 300 such that, when the movable partition is in a first position the auxiliary area 320 is available for use and with the movable partition in a second position the auxiliary area 320 is closed and the main area 318 is enlarged. In such cases, some of the sensors may be configured and positioned so that they sense in only the main area 318 or in different areas depending on the position of the movable partition. For example, gesture sensor 302 may, when the movable partition is in a first position, sense gestures in the auxiliary area 318. When the movable partition is in a second position, the same gesture sensor 302 may be configured to sense gestures in the proximal end of the main area 318. Similarly, a vision sensor (not shown) can be configured to capture computer vision in either the auxiliary area 320 or the main area 318 depending on the state of the movable partition.

Figure 4A:
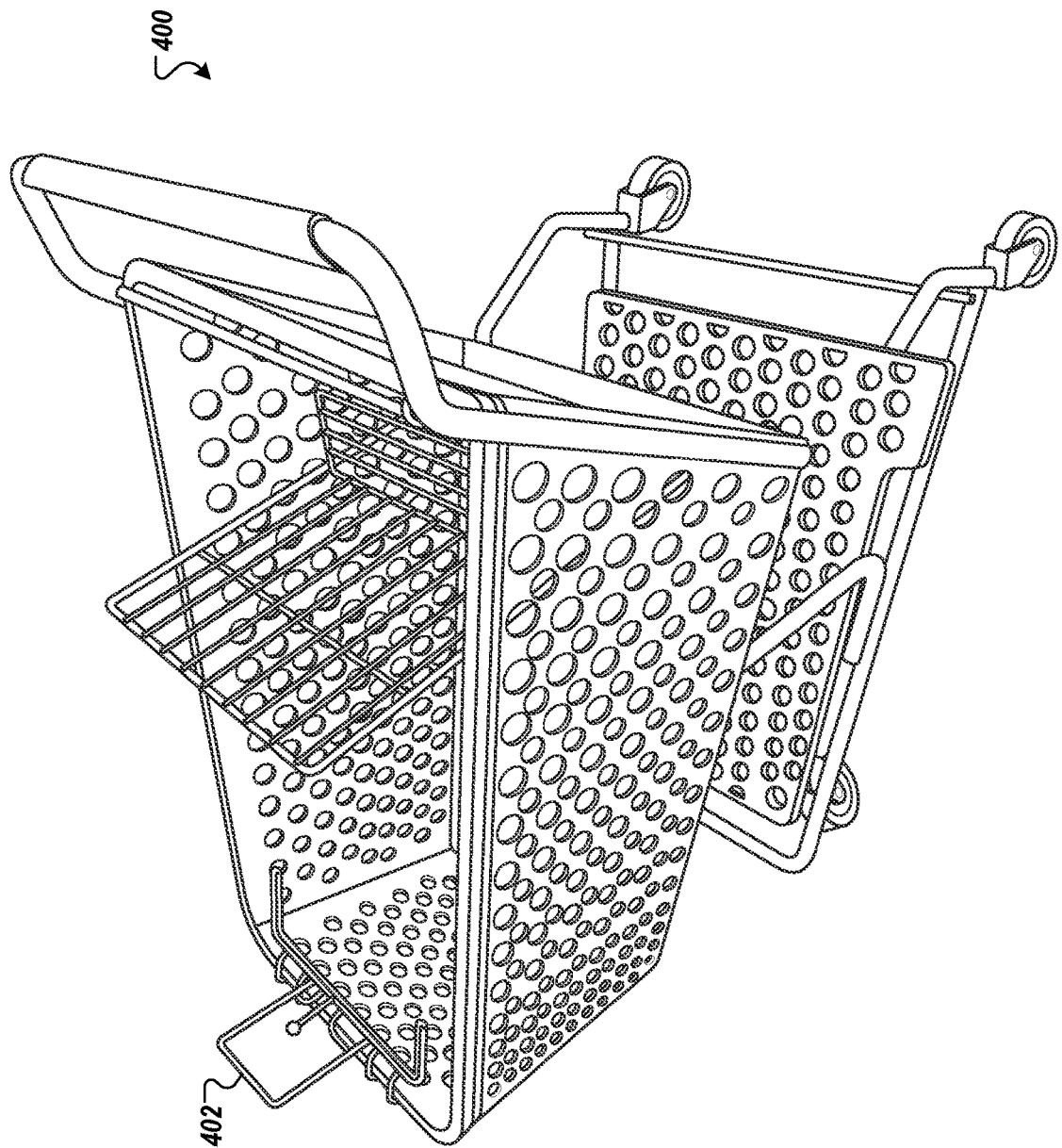
FIGS. 4A and 4B are examples of a physical shopping cart having a bag dispenser in the shopping cart.
Figure 4B:
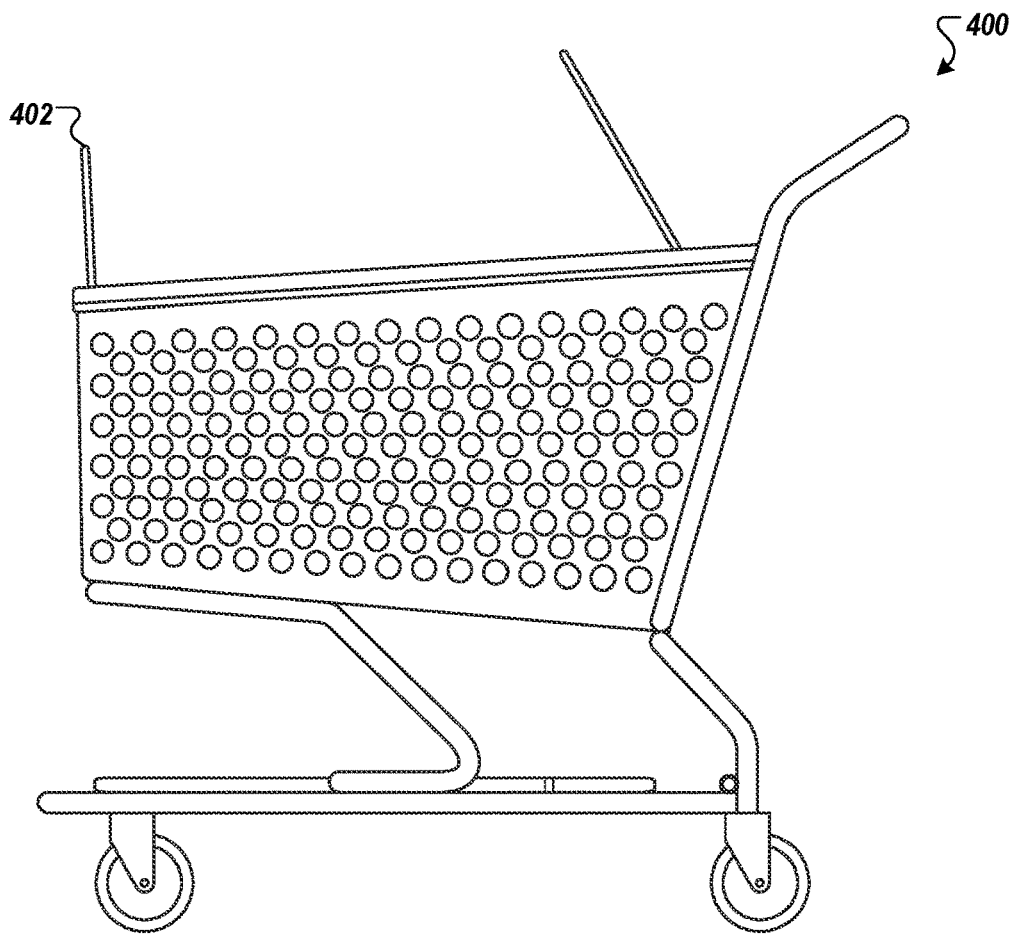
Figure 4B:
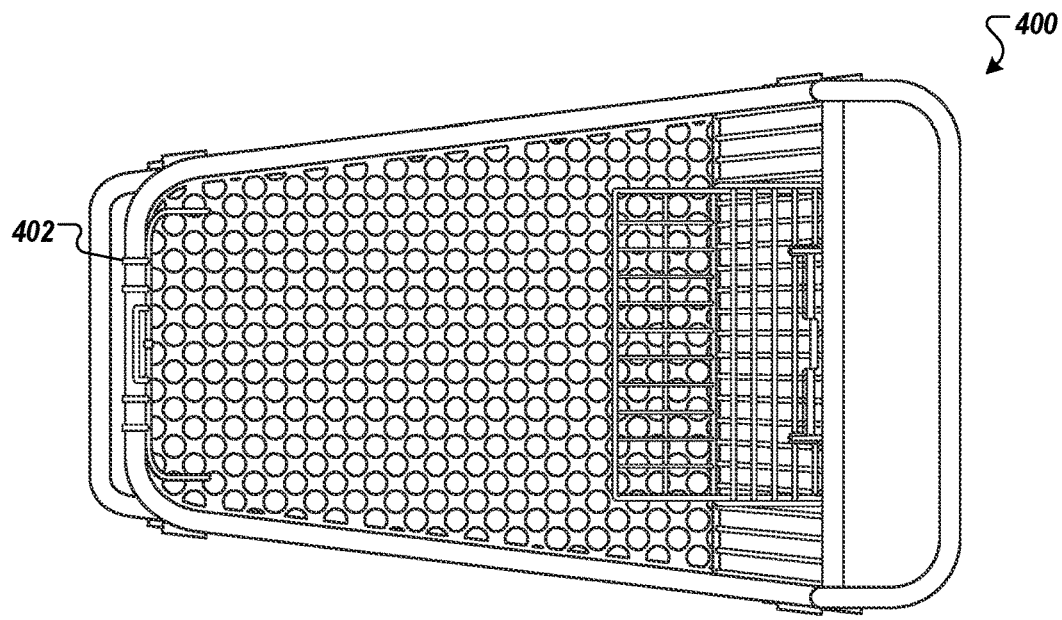

FIGS. 4A and 4B are examples of a physical shopping cart 400 having a bag dispenser 402 in the shopping cart. The physical shopping cart 400 can include elements (not shown) to track items placed into the physical shopping cart 400, such as a handheld scanner or sensors to automatically detect an item passing through a sensor plane at the opening of the basket of the physical shopping cart 400.

The bag dispenser 402 is mounted in the distal end of the basket of the physical shopping cart 400. That is, the bag dispenser 402 is mounted in the forward-most position within the basket, as the physical shopping cart 400 is being pushed forward by a user on the handle. This can advantageously position the bag dispenser 402 such that. However, in other implementations, the bag dispenser 402 may be positioned in another portion of the basket.

By placing the bag dispenser 402 within a cart that is configured for customer-driven checkouts (e.g., the physical shopping carts 100, 200, and/or 300), bags may be provided to a user that allows the user to bag their purchased physical items as part of placing the physical items into the basket of the physical shopping cart 400. Then, once the shopping session is completed and the customer has purchased the items in the physical shopping cart 400, the items will already be bagged. This can advantageously allow for a more efficient shopping experience if the shopping experience does not involve removing each item at a cashier's station at the end of the shopping experience.

In this example, the bag dispenser 402 includes a rack to hold open a plastic "t-shirt" bag. As the user is shopping, the user may fill up this bag with items. Once the bag is full, the user may remove the bag from the bag dispenser 402 within the basket, causing the next bag in the bag rack to be opened to receive items. However, other configurations may be used. For example, dispensers to hold reusable bags, fillable water jugs, barrels for bulk items, etc. may be used.

Figure 5A:
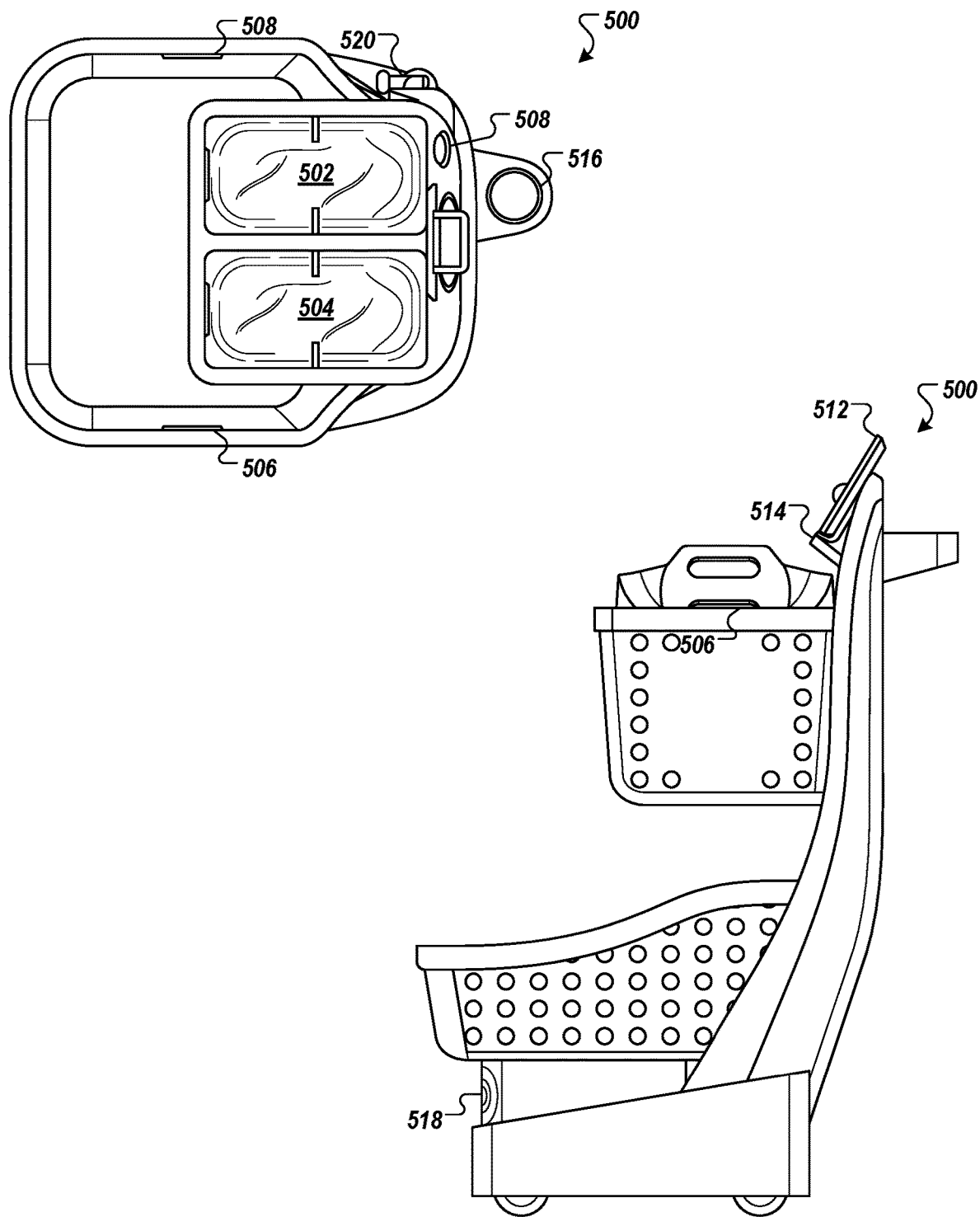
FIGS. 5A and 5B are examples of a physical shopping cart having features for detection of items placed into the physical shopping cart.
Figure 5B:
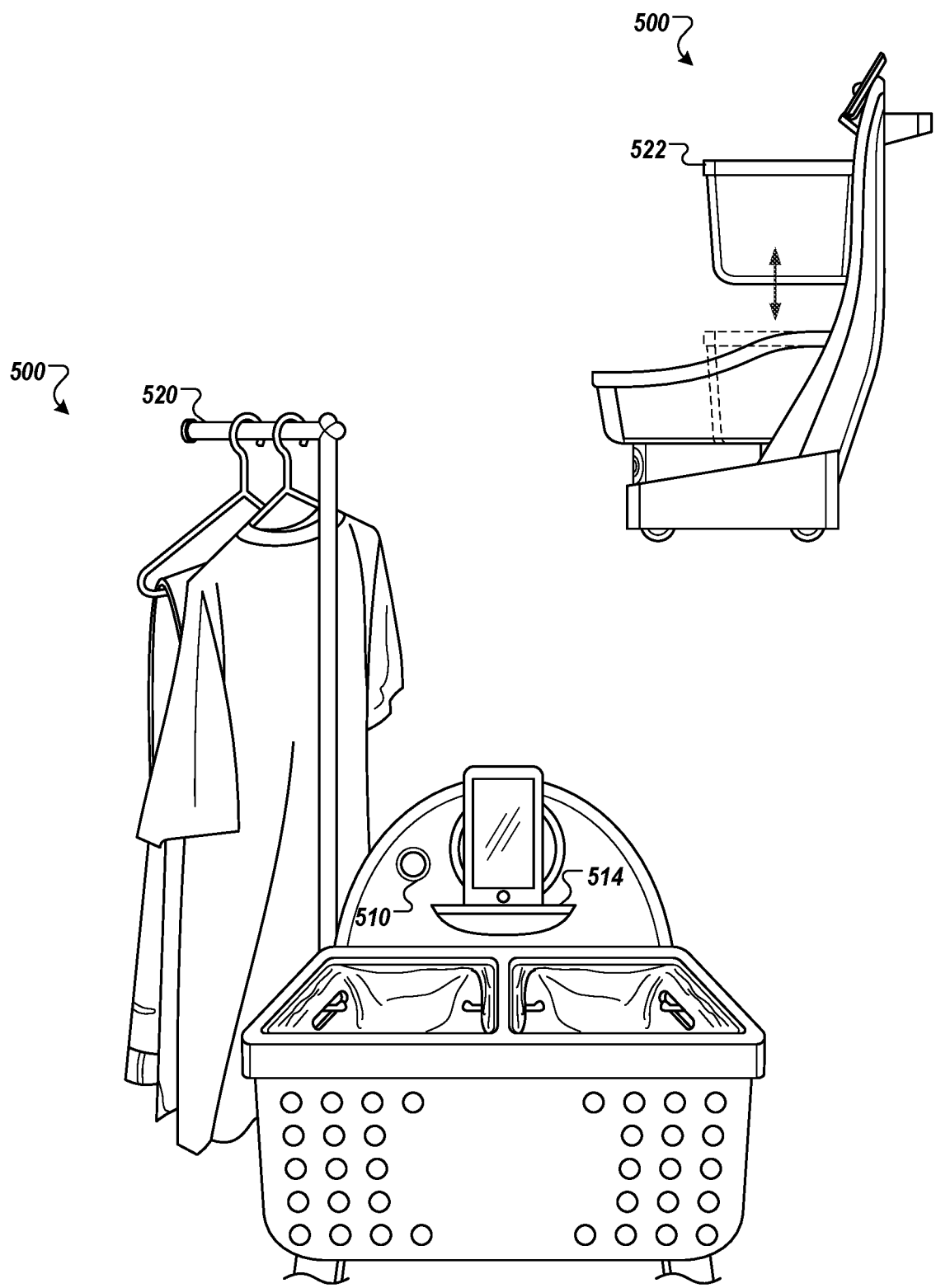

FIGS. 5A and 5B are examples of a physical shopping cart 500 having features for detection of items placed into the physical shopping cart. The physical shopping cart 500 can include elements (not shown) to track items placed into the physical shopping cart 500, such as a handheld scanner or sensor to automatically detect an item passing through a sensor plane at an opening of a basket of the physical shopping cart 500.

The physical shopping cart 500 can include bagging compartments 502 and 504 in a basket. Similar to as described above, these bags may be mounted in a mounting instrument and ready to receive an item placed by a user. As the user places the item into the bag, the item can be recognized by the physical shopping cart 500 using sensors 506 and 508 that create a sensor plane in the entrance to the basket.

Output to a user can be provided through light elements 510 and 512. The lighting elements 510 and 512 may include, for example, red and green lights such as light emitting diodes (LEDs) that activate to indicate to a user when certain events happen. These events can include, for example, a green light when an item is successfully recognized and a red light when an item is placed into the physical shopping cart 500 but not recognized successfully.

A mobile computing device 512 can physically mount to the physical shopping cart 500 when placed in a mounting fixture 514. Before or as part of physically mounting the mobile computing device 512 in the mounting fixture 514, the mobile computing device 512 can be logically paired with the physical shopping cart 500. In some cases, the mounting fixture 514 includes a charger configured to charge the mobile computing device 512 while mounted.

A secondary mounting fixture 516 can be adapted to receive another item. For example, the secondary mounting fixture 516 can include a circular through-hole with chamfered or angled side-walls to receive and hold a beverage. In another example, the secondary mounting fixture 516 can be adapted to receive a scanner logically paired with the physical shopping cart 500.

One or more environmental sensors 518 can be configured to sense the environment and/or the physical shopping cart's 500 location within the environment. For example, the physical shopping cart 500 can sense the location of the user and other humans in the environment. This sensing may be used by the physical shopping cart 500 to autonomously navigate in the environment, to follow the user, to move itself to a staging area, to lead the user to a particular product in a store environment, etc.

A folding, telescoping rack 520 may be included in the physical shopping cart. This rack 520 may be folded and stowed within the physical shopping cart 500 when not in use, and then configured to be accessible when in use. A user may hang items on the rack 520 instead of placing the items into the physical shopping cart 500. In order to sense the items, the rack 520 can include one or more sensors. For example, an RFID sensor may be embedded in the rack 520 in order to sense items hung from the rack 520.

As shown in FIG. 5B, one or more baskets 522 may be locationally adjusted. In this example, the basket 522 is able to slide vertically, into an upper locked-position and into a lower locked-position. This can allow the customer to adjust the physical shopping cart 500 into a comfortable configuration for use while shopping.

Features available in the physical shopping cart 500 include, but are not limited to, tracking steps while shopping, paging a retail employee for assistance, showing details of the nearby environment, locating and routing to a requested item in the retail environment, entertainment such as video games or entertainment video, and personalized offers based on guest preference and proximity to products.

Figure 6:
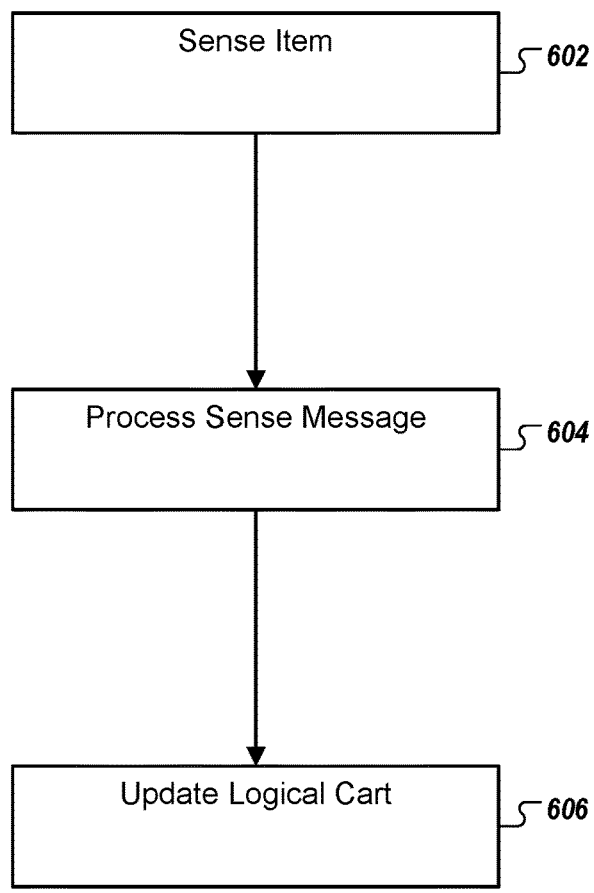
FIG. 6 is an example swimlane diagram of a process for completing a shopping transaction using a physical shopping cart and a mobile computing device.

FIG. 6 is an example flowchart of a process 600 for completing a shopping transaction using a physical shopping cart and a mobile computing device. The process 600 can be completed by, for example, a sensor or sensor array, a controller, a server, and/or a mobile computing device. For example, the sensor array may include a gesture sensor, a computer vision sensor, and an RFID sensors. The controller may include a data processor and computer memory. The server may include a data processor and computer memory. The mobile computing device may include a phone, a table, or other mobile computing device.

An item is sensed 602. For example, a customer walking through a retail store, the customer can browse for an item they would like to purchase. Eventually, the customer finds a jar of pickles that they would like to purchase, and places the pickles into their shopping cart, which is sensed by the cart. This sensing can generate one or more data messages, which will be referred to as sense-messages.

The sense-message is processed 604. For example, the controller 604 can process the sense messages received in order to identify the pickle jar as the item that was placed into the cart. This processing may take different forms based on the kind of sense-message used or received.

In some cases, the processing 604 can be performed completely by a controller on the cart without the assistance of another computing device. For example, the controller may have sufficient hardware (e.g., data processor, computer memory) and software/data (e.g., a vision recognition system, a library of images of known products, and a table mapping the images to information about the products). In this example, the controller is able to identify the pickle product without further data communication to another data processing device. This may be advantageous, for example, to allow for flexible scaling of physical shopping carts within a store, with each new shopping cart bringing along the computing power needed to handle the physical shopping carts computing workload.

In some cases, the processing 604 can be performed by the controller in conjunction with another computing device. For example, the controller may transmit some data (e.g., an image of the pickle jar) to an off-shopping-cart computing device (e.g. a server managed by the store and physically located separate from the physical shopping cart) for some of the processing. This may be advantageous, for example, to allow for a single point-of-contact for updates to product information within a store.

The logical cart is updated 620. For example, an application on the mobile computing device 606 can maintain a logical shopping cart that is a data construct that mirrors the state of the physical shopping cart that the user is using. When the pickle jar is added as the first item to the physical shopping cart, the mobile computing device can update the logical shopping cart to go from an empty state to a state in which the logical shopping cart contains a record of a single pickle product. Later, when the customer adds a bottle of mustard to the physical shopping cart and an update-message is received to indicate the added mustard, the mobile computing device can add a record of the mustard to the logical shopping cart. When the user in this example removes the mustard from the physical shopping cart and an update-message indicating a reduction of one to the mustard product, the mobile computing device 606 can reduce the count of the mustard product and/or remove the mustard product from the logical shopping cart.

Figure 7A:
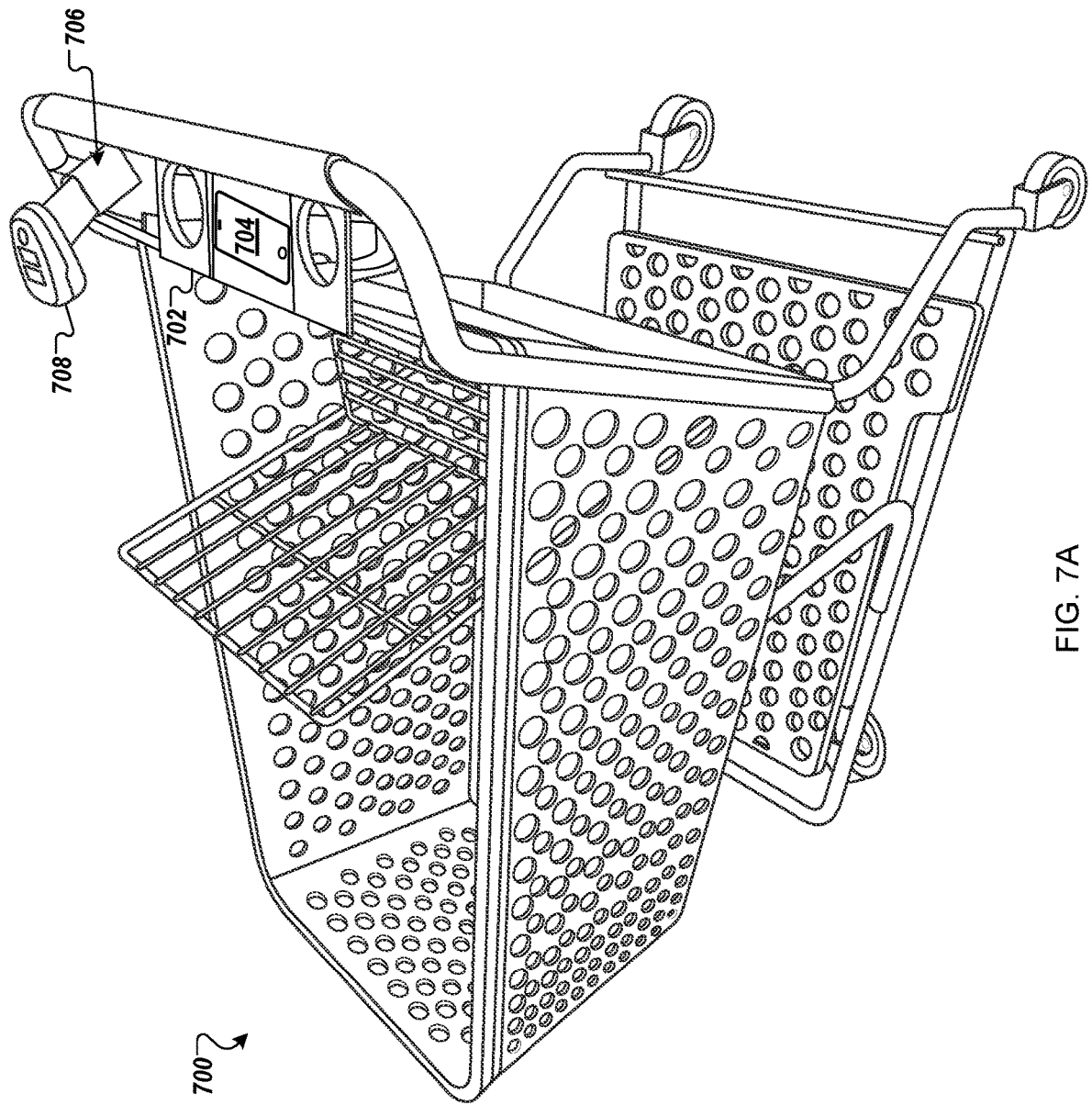
FIGS. 7A and 7B are additional examples of a physical shopping cart having a mounting fixture for mounting a mobile computing device and a scanner.
Figure 7B:
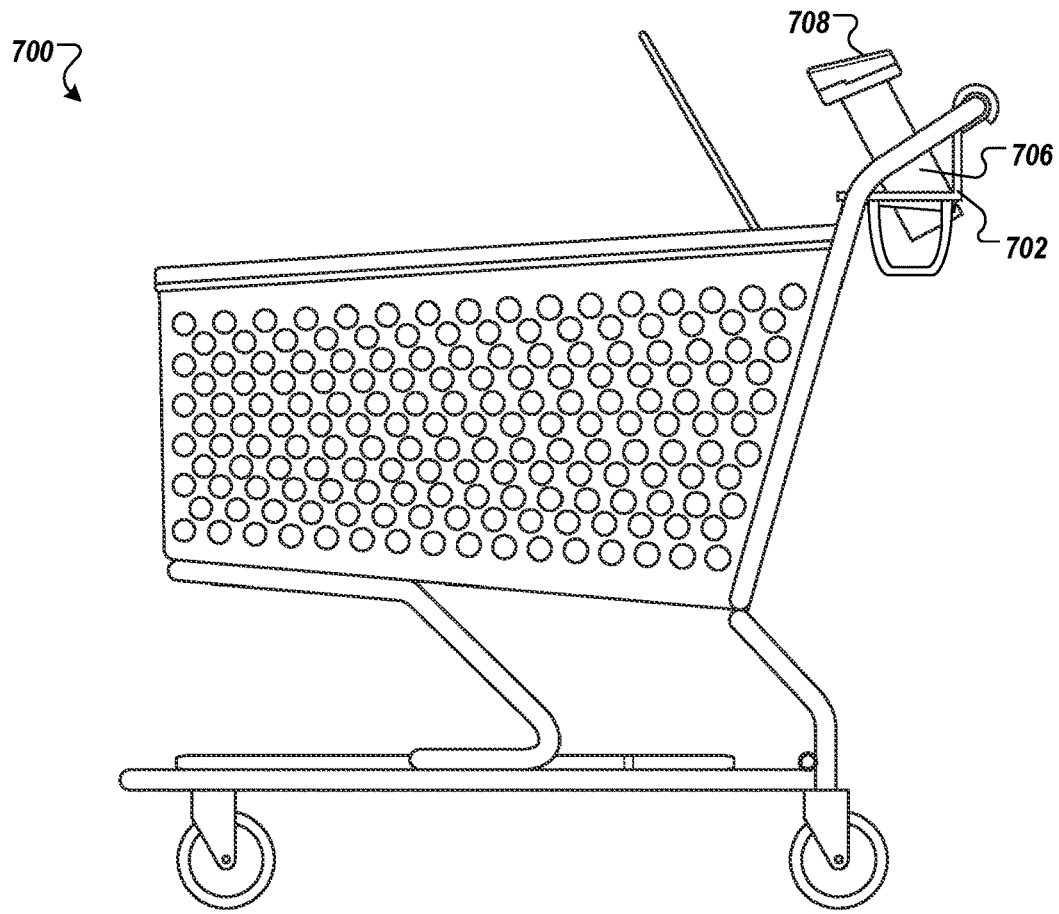
Figure 7B:
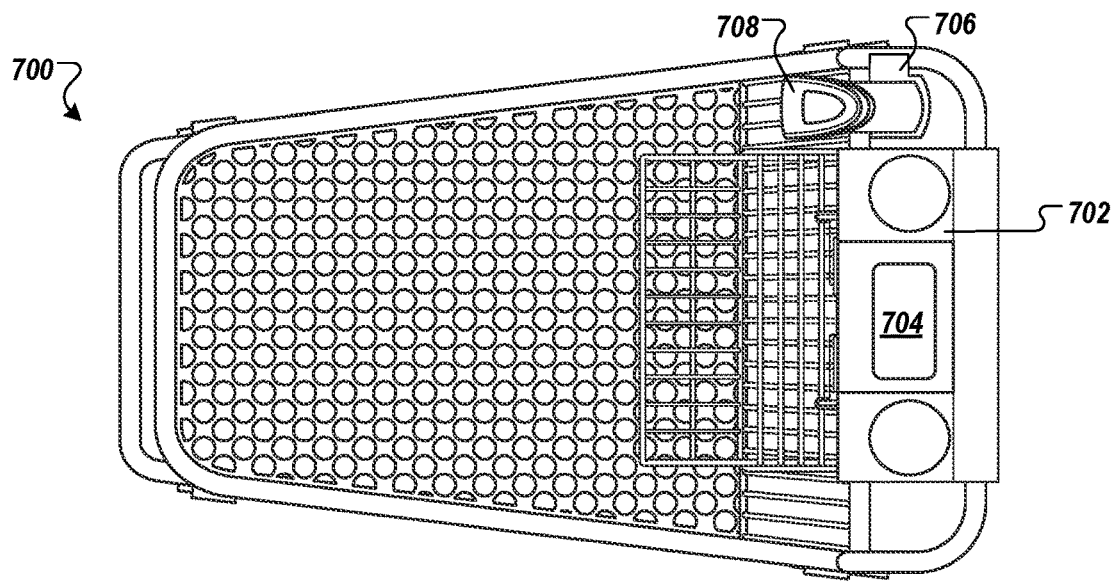

FIGS. 7A and 7B are additional examples of a physical shopping cart 700 having mounting fixtures 702 and 706 for mounting a mobile computing device 704 and a scanner 708. The shopping cart 700 and the mounting fixtures 702 and 706 are similar to those described above with regard to FIGS. 2A-B, but with some distinct differences. In particular, unlike the first and second mounting fixtures 202 and 206, which are part of a common or attached physical structure, in the depicted example the first mounting fixture 702 and the second mounting fixture 706 are physically separate from each other, which permits for the second mounting fixture 706 to be positioned along a side rail of the handle of the cart 700. Such positioning of the second mounting fixture 706 along the side rail permits for the scanner 708 to be held in a convenient location for retrieval by a user while shopping (e.g., near the position of the user's hand while pushing the cart 200). Additionally, such positioning keeps the scanner 708 out of position Another difference is that the first mounting fixture 702 has a simplified design that includes cup holders with a larger tray to hold a user's mobile computing device 704, such as a smartphone or tablet device. The tray in the mounting fixture 702 can be centrally positioned between the cup holders so that the screen, which may be automatically updated to display the current contents of the shopping cart 200, so that it is readily visible. The tray can, in some instances, be tilted backward toward the user so that the screen is easier for a user to see while using the shopping cart 200 and also to better retain the device 704 in the first mounting fixture 702 (e.g., to avoid the device 704 falling out of the mounting fixture 702 while moving the cart 700). The tray in the mounting fixture 702 can be designed to permit the device 704 to be retained in a landscape orientation, and/or to be retained in a portrait orientation.

Figure 8A:
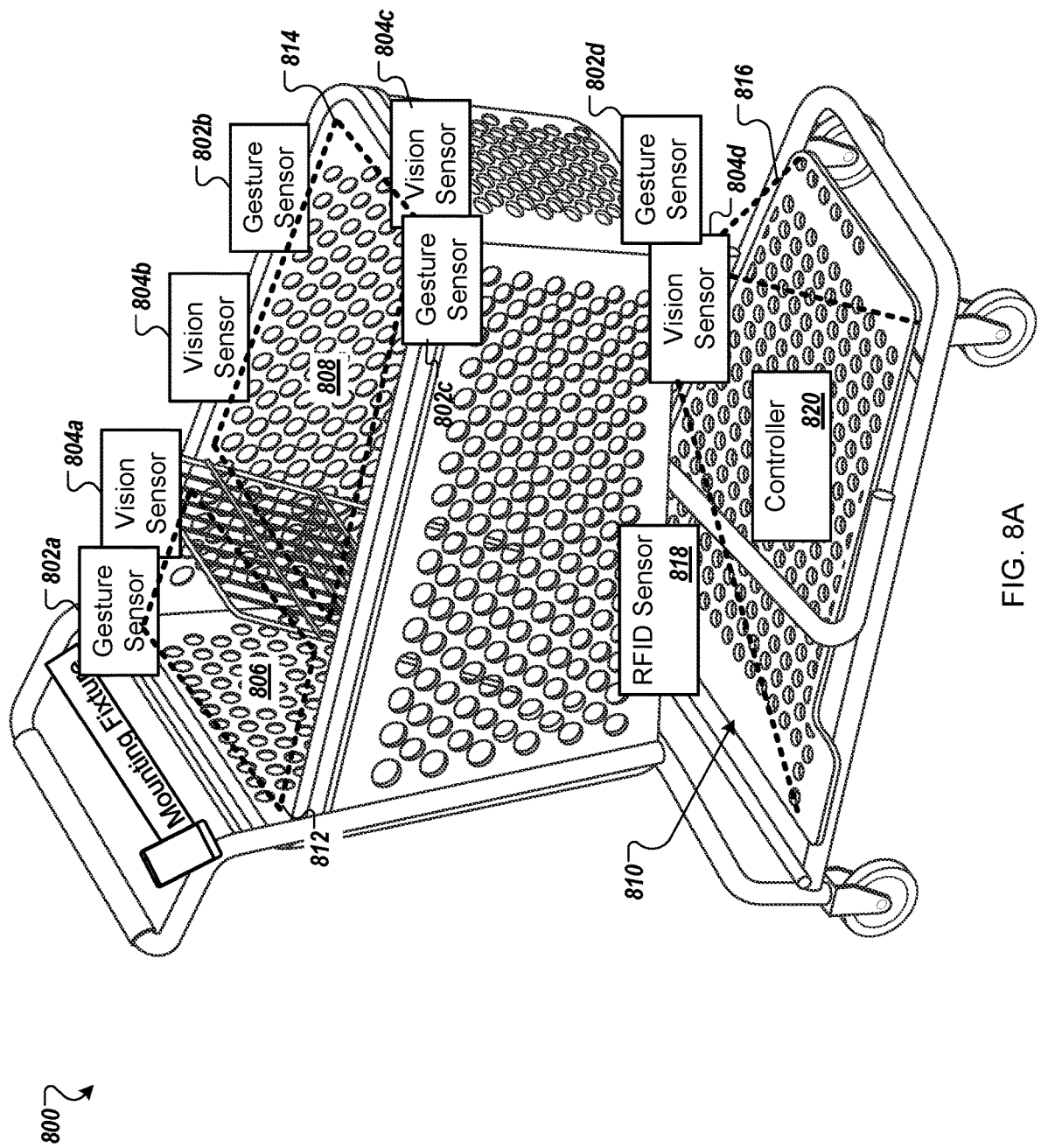
FIGS. 8A and 8B are additional examples of a physical shopping cart having sensors to automatically detect items placed in the shopping cart.
Figure 8B:
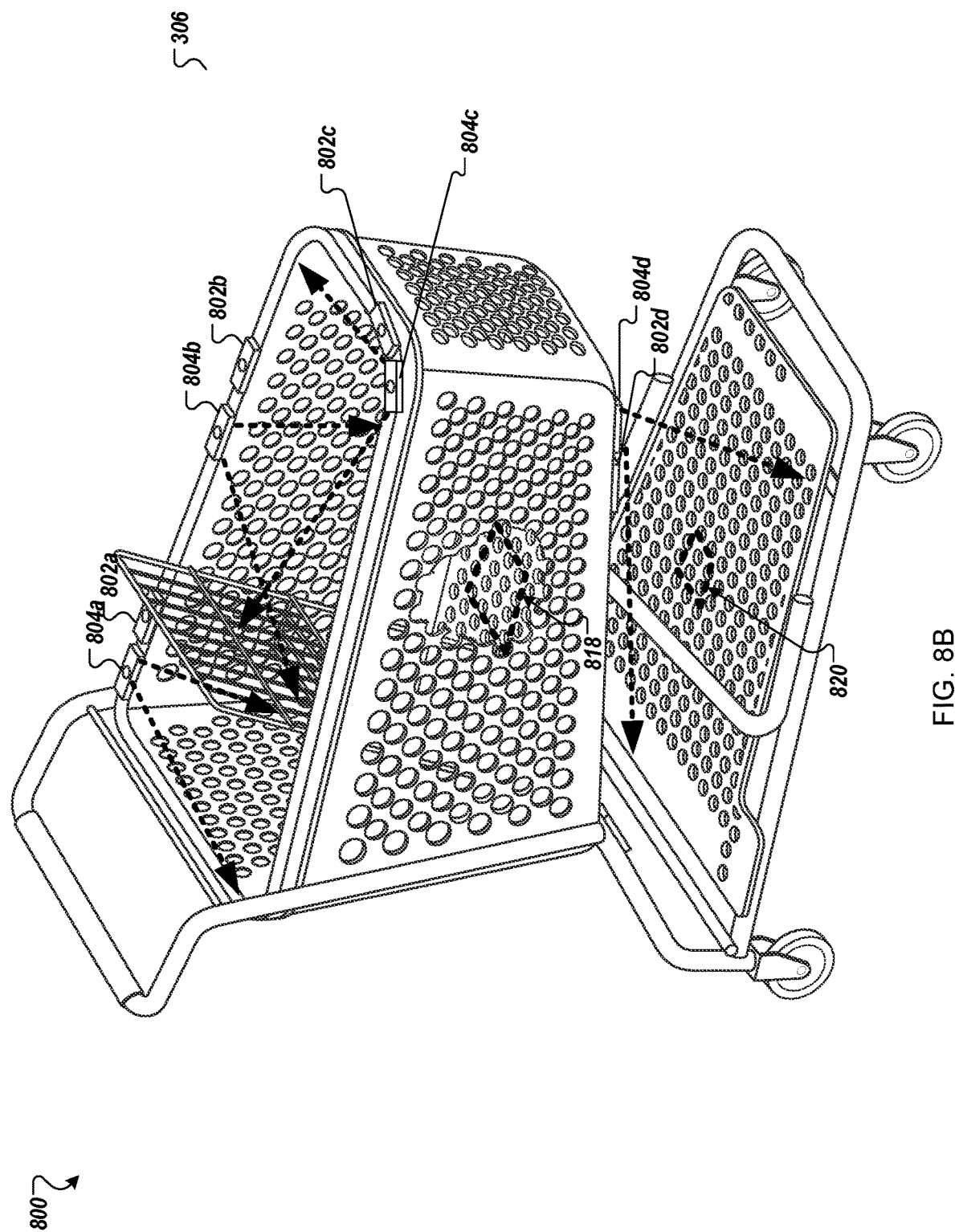

FIGS. 8A and 8B are additional examples of a physical shopping cart 800 having sensors to automatically detect items placed in the cart. The example shopping cart 800 and its depicted sensors can be similar to the cart 300 described above with regard to FIGS. 3A-B, but with some distinct differences. In particular, the gesture sensors 802*a-d* can be paired with vision sensors 804*a-d*, including in auxiliary area 806, the main area 808, and the undercart area 810. By pairing gesture sensors 802*a-d* with visions sensors 804*a-d*, separate and detection distinct planes/zones 812, 814, and 816 can be monitored by different groups of sensors. For example, items placed in the auxiliary area 806 can be initially detected by the gesture sensor 802*a*, which can prompt image capture by the corresponding vision sensor 804*a* for the auxiliary area 806. Similar pairings of gesture sensors and vision sensors can be used to monitor the planes/zones 814 and 816. The benefit of pairing gesture and vision sensors with each other to establish separate and independently operable zones is, for example, that it can increase the robustness of automatic product detection (e.g., automatic product detection is not limited to just the main area 808). This can, as a result, decrease the amount of prompting/user action that is required to ensure that all items placed in the cart 800 properly scanned, either though automatic detection/scanning or through manual scanning, which can increase the robustness of the technical solution that is provided by the cart 800.

Another difference over the sensor arrangement described above with regard to FIGS. 3A-B is the positioning of the sensors and other components along the cart 800. For example, in the main area 808 a first pair of gesture and vision sensors 802*b*, 804*b* can be placed along a side of the cart so that they are facing laterally across the cart 800. A second pair of gesture and vision sensors 802*c*, 804*c* can be placed in an opposing far corner of the cart 800 so that they are facing diagonally back toward the first pair of sensors. By having the diagonally opposing offset vantage points of the first pair of sensors 802*b*, 804*b* and the second pair of sensors 802*c*, 804*c*, the plane 814 for the main area can be better and more robustly covered by the sensors so as to avoid missing items being placed in the main area 808, regardless of the direction from which or the location of the main area 808 into which items are placed. For instance, referring to FIG. 8B, while the generally diagonally offset vantage points of the first pair of sensors 802*b*, 804*b* and the second pair of sensors 802*c*, 804*c* in the main area 808 overlap to some extent, they provide coverage for the entirety of the main area 808 of the cart 800. While there are not multiple pairs of sensors depicted as being used in the auxiliary area (one pair of sensors 802*a*, 804*a*) or the undercart area (one pair of sensors 802*d*, 802*d*), these areas can be more constrained and, as a result, may be adequately covered by a single pair of sensors. In some implementations, multiple pairs of sensors may be used in these areas as well, and they may also used offset and partially overlapping vantage points so as to ensure adequate coverage of the area being scanned.

Another difference from the sensor arrangements described above with regard to FIGS. 3A-B is that, in the examples depicted in FIGS. 8A-B, the RFID sensors 818 and the controller 820 can be secured to the underside of portions of the cart 800, so as to avoid damage, tampering, or other actions being performed to these components that would potentially frustrate operation of the cart 800. For example, the RFID sensors 818 can be affixed to and/or embedded within an underside of the main area of the cart 800, as indicated by the dashed lines in FIG. 8B. By positioning the RFID sensors 818 at, near, or otherwise around a centroid of the volume of the shopping cart 800, which may store goods, the RFID sensors 818 can be best positioned to capture RFID signals reflected back from items placed in any part of the cart 800, including the auxiliary area 806 and the undercard area 810. Similarly, the controller 820 can be affixed to and/or embedded within an underside of the shelf that forms the floor/surface of the undercart area 810, as indicated by the dashed lines representing the controller 820 in FIG. 8B. By positioning the controller 820 in such a location, which may be the area of the cart 800 that is least likely to be contacted, touched, or otherwise manipulated by a user of the car 800, the cart 800 can protect against damage, tampering, and/or other actions that could negatively affect the controller 820.

The sensors 802*a-d*, 804*a-d*, 818 and other components (e.g., controller 820) described with regard to FIGS. 8A-B can be the same as or similar to the sensors and other components described above with regard to FIGS. 3A-B. For example, the gesture sensors 802*a-d* can include proximity sensors, distance sensors, laser sensors (e.g., tripline sensors), and/or other sensors that can detect movement and, in some instance, directionality of the movement. For instance, the gesture sensors 802*a-d* can include hardware capable of discerning the direction of a gesture.

Figure 9A:
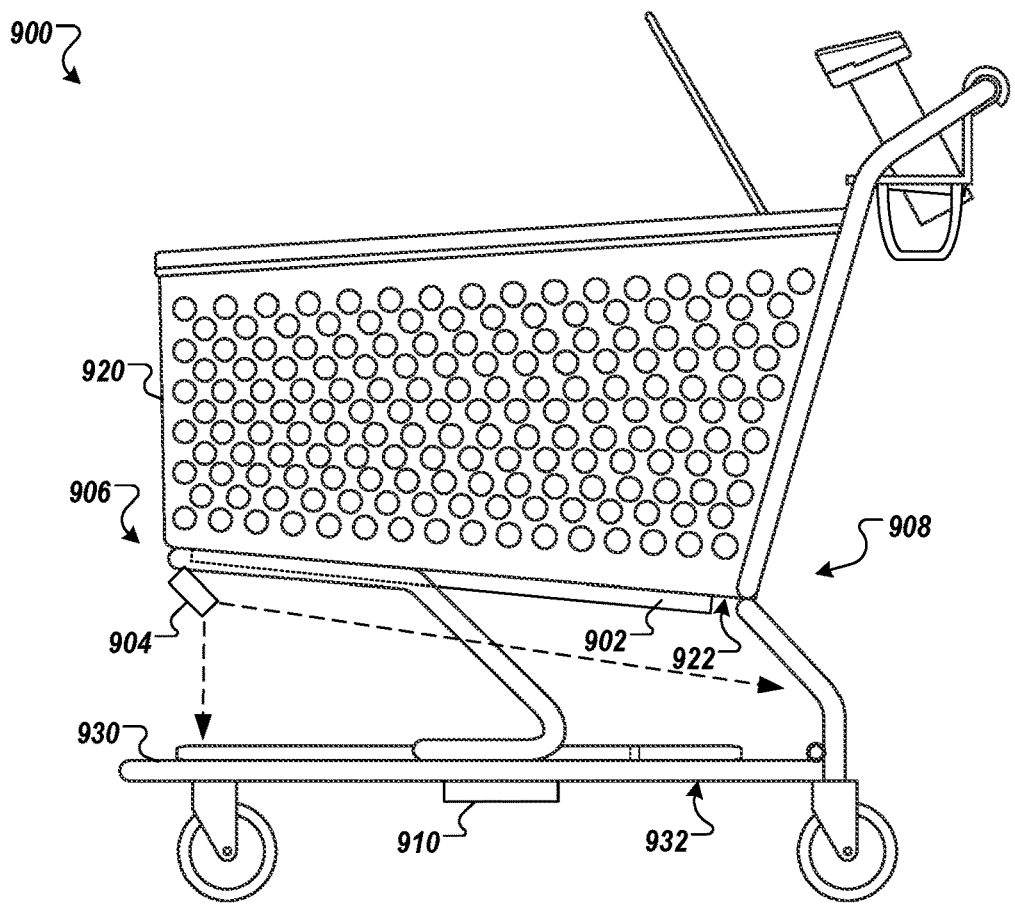
FIGS. 9A-C are additional examples of a physical shopping cart having sensors to automatically detect items placed in the shopping cart.
Figure 9B:
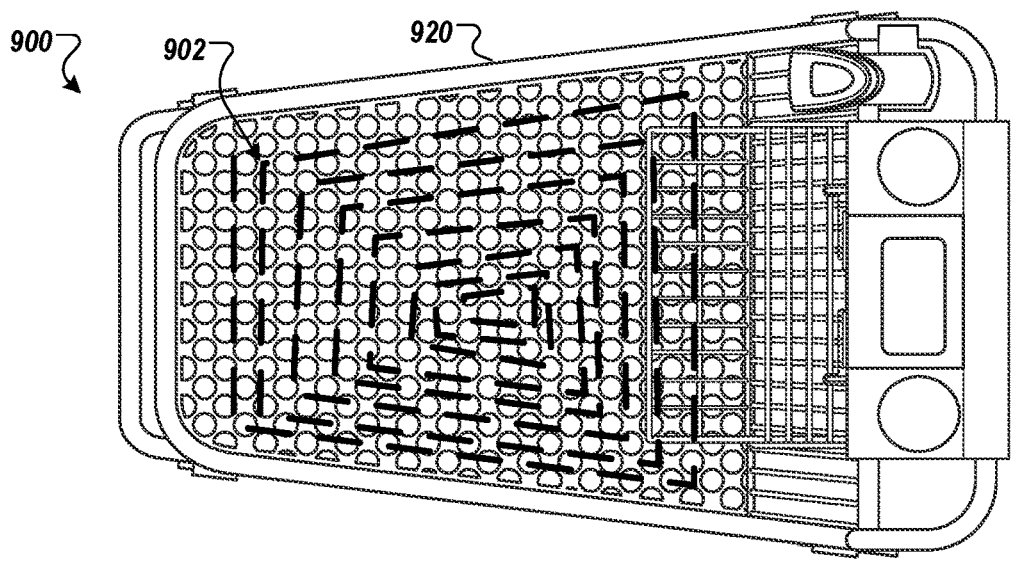
Figure 9C:
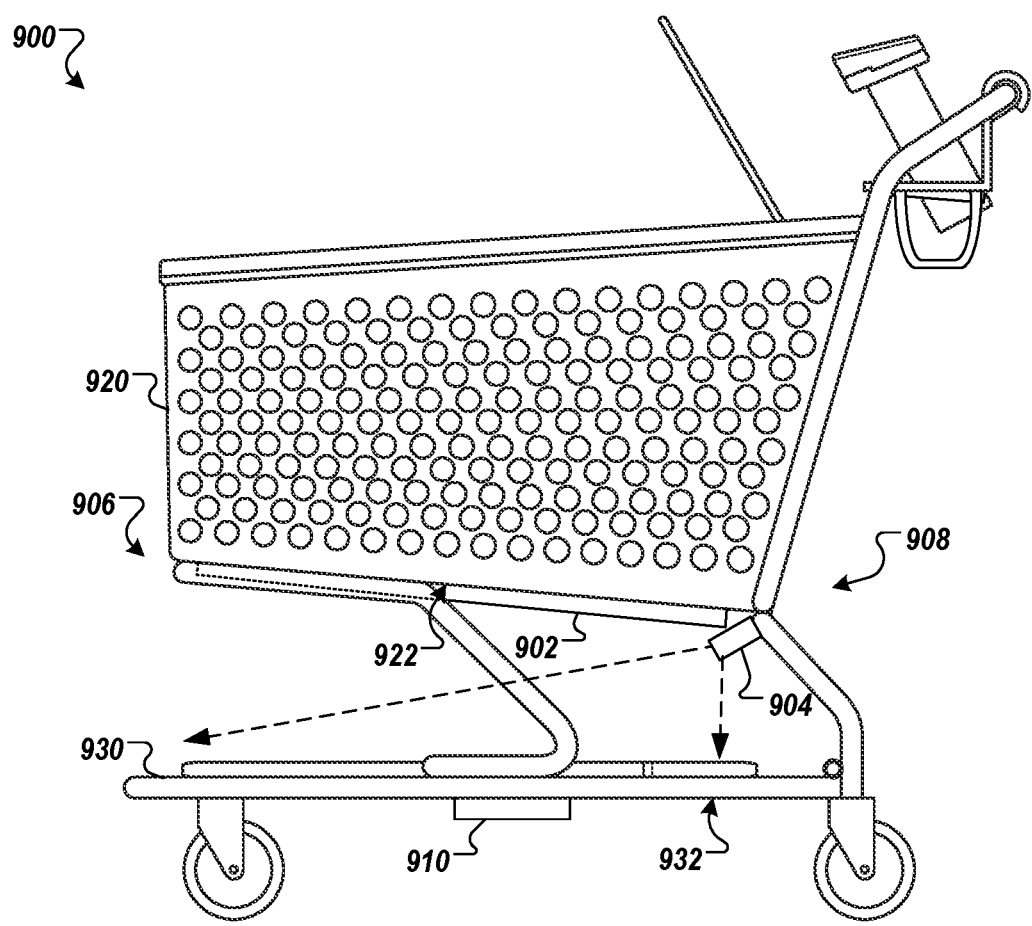

FIGS. 9A-C are additional examples of a physical shopping cart 900 having sensors to automatically detect items placed in the shopping cart. Referring to FIG. 9A, which shows a side-view of the cart 900, an example positioning of an RFID sensor 902 is depicted on an underside 922 of the main cart area 920. An example pattern for an antenna for the RFID sensor 902 is depicted in FIG. 9B, which presents an overhead view of the cart 900 with the antenna for the RFID sensor 902 traversing around the main area 920 of the cart 900 so as to provide robust signal reception and coverage. Additionally and/or alternative patterns can be used.

Referring back to FIG. 9A, the sensor 904 for detecting items placed in the undercart area is depicted as being mounted to the underside 922 of the main cart area 920 at or near a front 906 of the cart 900. The sensor 904 can be mounted at a downward angle so as to have a vantage point directed down and back toward a rear 908 of the cart 900, which can provide for robust coverage of the undercart area so as to ensure that items placed in this area are detected. The controller 910 can be mounted to an underside 932 of a shelf/floor 930 of the undercart area, as described above.

Alternative mounting locations of these sensors and/or devices are also possible. For example, referring to FIG. 9C, the sensor 904 can alternatively be mounted to the underside 922 of the main cart area 920 at the rear 908 of the cart 900. The sensor 904 can be mounted at a downward angle that is facing forward toward a front 906 of the cart 900 so as to robustly capture items that are placed in the underside area of the cart 900. Other configurations are also possible.

Figure 10:
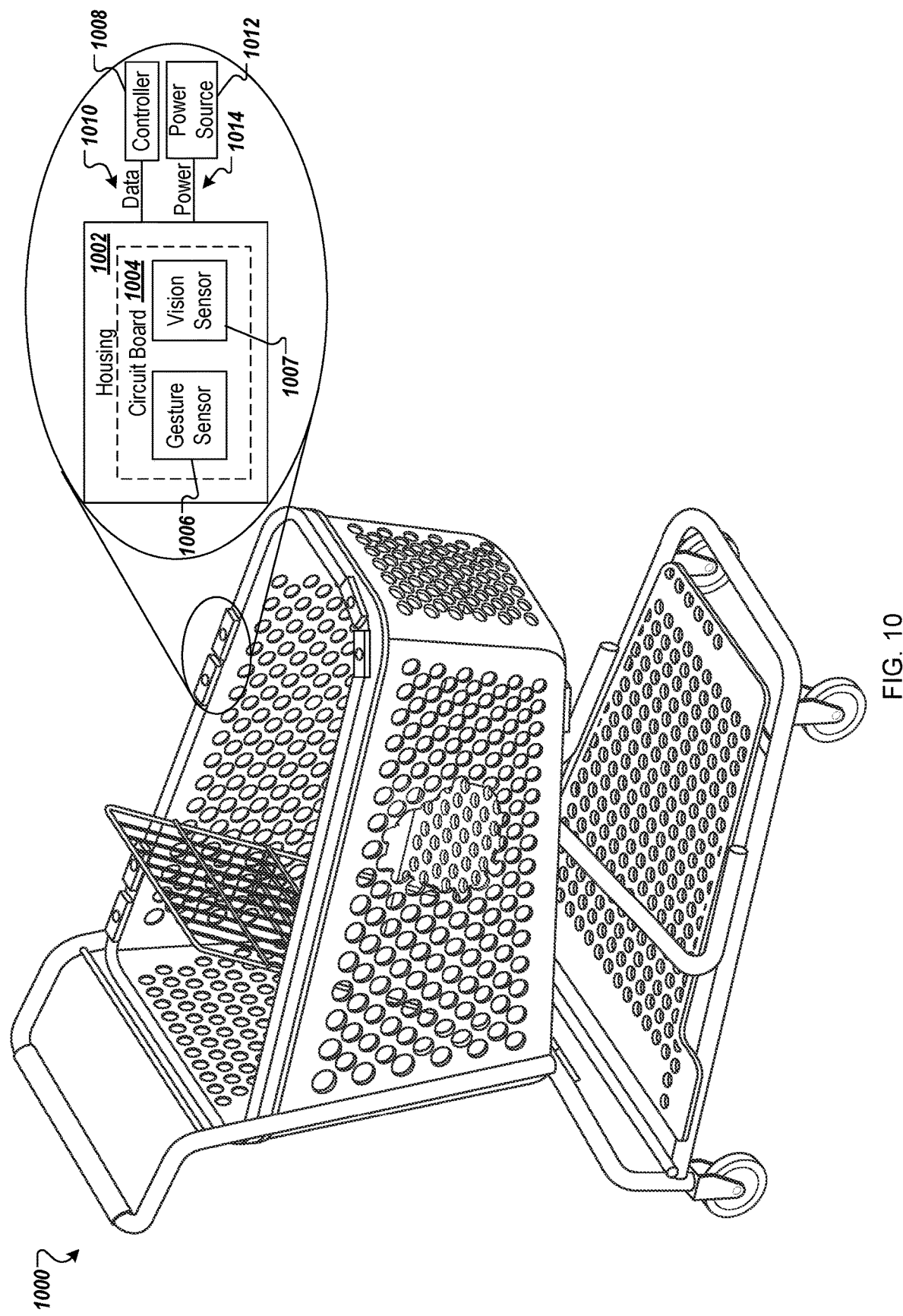
FIG. 10 is an example sensor arrangement for use with a physical shopping cart.

FIG. 10 is an example sensor arrangement for use with a physical shopping cart 1000. As depicted in this example, a pair of a gesture sensor 1006 and a vision sensor 1007 pair can be combined into a single housing 1002. In some instances, the gesture sensor 1006 and the vision sensor 1007 can be combined on the same circuit board 1004. By providing the gesture sensor 1006 and the vision sensor 1007 in a common housing 1002, the number of components that are needed to implement the cart 1000 can be reduced. Similarly, the combined gesture sensor 1006 and vision sensor 1007 may share wired data and power connections 1010, 1014 with a controller 1008 and power supply 1012, which can additionally reduce the amount of wiring that is needed to be run throughout the frame of the cart 1000. Some or all of the pairs of gesture and vision sensors described throughout this document can be combined in a similar way within a common housing and/or can use common data and/or power wired connections.

Figure 11:
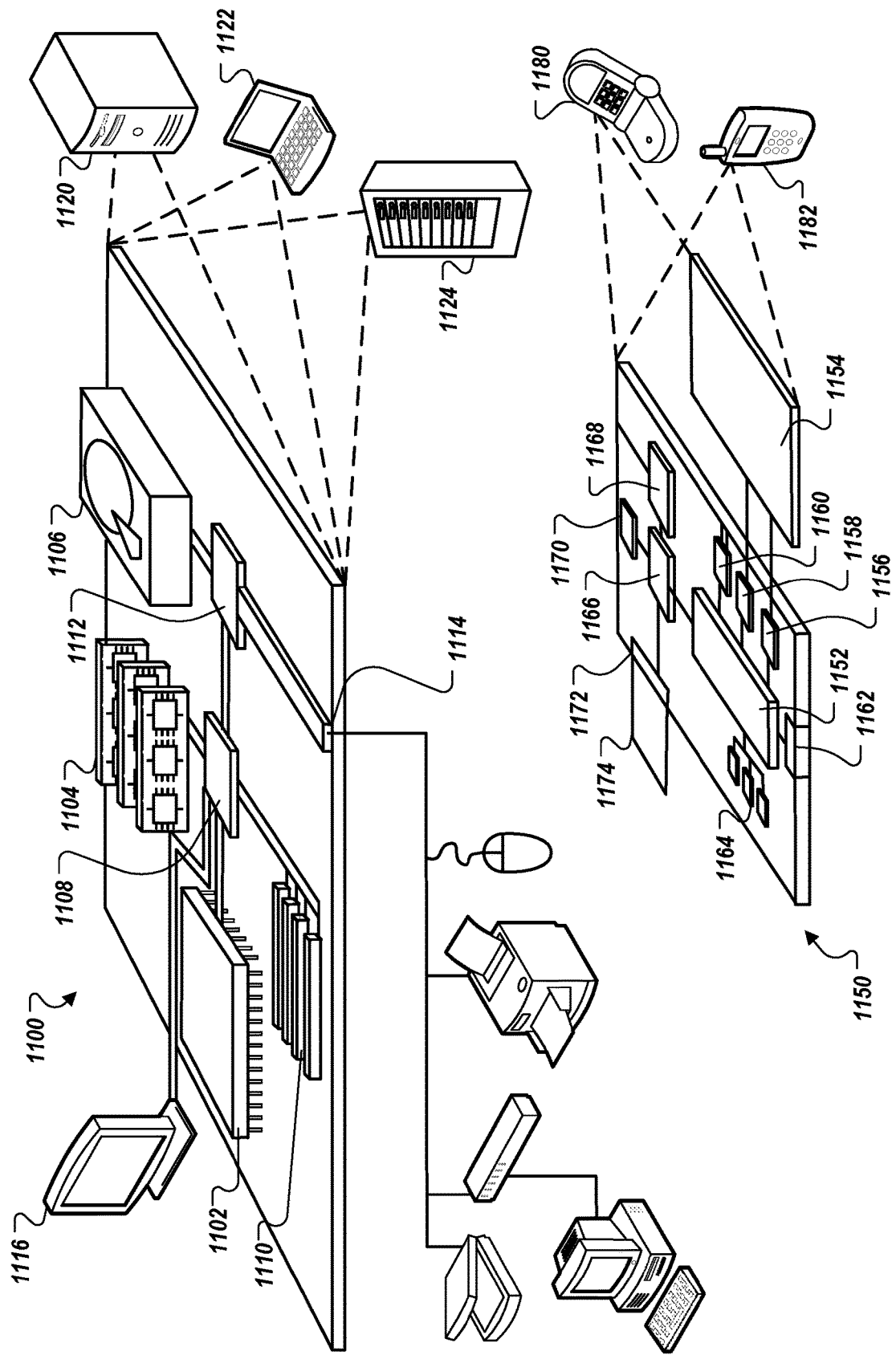
FIG. 11 is a schematic diagram that shows an example of a computing system.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 may also be another form of computer-readable medium, such as a magnetic or optical disk.

The storage device 1106 is capable of providing mass storage for the computing device 1100. In some implementations, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which may accept various expansion cards (not shown). In the implementation, the low-speed interface 1112 is coupled to the storage device 1106 and the low-speed expansion port 1114. The low-speed expansion port 1114, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. In addition, it may be implemented in a personal computer such as a laptop computer 1122. It may also be implemented as part of a rack server system 1124. Alternatively, components from the computing device 1100 may be combined with other components in a mobile device (not shown), such as a mobile computing device 1150. Each of such devices may contain one or more of the computing device 1100 and the mobile computing device 1150, and an entire system may be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 may also be provided with a storage device, such as a micro-drive or other device, to provide additional storage. Each of the processor 1152, the memory 1164, the display 1154, the communication interface 1166, and the transceiver 1168, are interconnected using various buses, and several of the components may be mounted on a common motherboard or in other manners as appropriate.

The processor 1152 can execute instructions within the mobile computing device 1150, including instructions stored in the memory 1164. The processor 1152 may be implemented as a chipset of chips that include separate and multiple analog and digital processors. The processor 1152 may provide, for example, for coordination of the other components of the mobile computing device 1150, such as control of user interfaces, applications run by the mobile computing device 1150, and wireless communication by the mobile computing device 1150.

The processor 1152 may communicate with a user through a control interface 1158 and a display interface 1156 coupled to the display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may provide communication with the processor 1152, so as to enable near area communication of the mobile computing device 1150 with other devices. The external interface 1162 may provide, for example, for wired communication in some implementations, or for wireless communication in other implementations, and multiple interfaces may also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 may also be provided and connected to the mobile computing device 1150 through an expansion interface 1172, which may include, for example, a SIMM (Single In Line Memory Module) card interface. The expansion memory 1174 may provide extra storage space for the mobile computing device 1150, or may also store applications or other information for the mobile computing device 1150. Specifically, the expansion memory 1174 may include instructions to carry out or supplement the processes described above, and may include secure information also. Thus, for example, the expansion memory 1174 may be provide as a security module for the mobile computing device 1150, and may be programmed with instructions that permit secure use of the mobile computing device 1150. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 may communicate wirelessly through the communication interface 1166, which may include digital signal processing circuitry where necessary. The communication interface 1166 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1168 using a radio-frequency. In addition, short-range communication may occur, such as using a Bluetooth, WiFi, or other such transceiver (not shown). In addition, a GPS (Global Positioning System) receiver module 1170 may provide additional navigation- and location-related wireless data to the mobile computing device 1150, which may be used as appropriate by applications running on the mobile computing device 1150.

The mobile computing device 1150 may also communicate audibly using an audio codec 1160, which may receive spoken information from a user and convert it to usable digital information. The audio codec 1160 may likewise generate audible sound for a user, such as through a speaker, e.g., in a handset of the mobile computing device 1150. Such sound may include sound from voice telephone calls, may include recorded sound (e.g., voice messages, music files, etc.) and may also include sound generated by applications operating on the mobile computing device 1150.

The mobile computing device 1150 may be implemented in a number of different forms, as shown in the figure. For example, it may be implemented as a cellular telephone 1180. It may also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A shopping cart for use in a retail environment, the shopping cart comprising:
    a basket with a bottom surface and sidewalls that, collectively, define a cavity to receive and retain goods, wherein the basket includes an opening defined by an upper perimeter of the sidewalls;
    a plurality of gesture sensors that are attached to the basket at or near the upper perimeter of the sidewalls, wherein the plurality of gesture sensors are configured to detect movement of items at or near the upper perimeter of the sidewalls;
    a plurality of cameras that are attached to the basket at or near the upper perimeter of the sidewalls, wherein the plurality of cameras are configured to capture images of the items as the items are placed into or removed out of the basket;
    a controller that is configured to identify the items based on the images captured by the plurality of cameras, to update a virtual shopping cart based on the identification of the items, and to generate output signals configured to provide feedback related to identification of the items to a user of the shopping cart;

a handle area by which the user can push the shopping cart around a retail environment, wherein the handle area includes a handle and a surface, wherein the surface is positioned frontward from the handle and faces the basket; and one or more lights attached to the surface of the handle area, wherein the one or more lights are configured to be selectively illuminated based on the output signals generated by the controller.

2. The shopping cart of claim 1, wherein the plurality of gesture sensors are configured to determine directionality of the items that are placed into or removed out of the basket.

3. The shopping cart of claim 1, wherein the plurality of gesture sensors are configured to detect proximity of the items to the basket.

4. The shopping cart of claim 1, wherein the plurality of gesture sensors comprise proximity sensors.

5. The shopping cart of claim 1, wherein the one or more lights are positioned above the upper perimeter of the sidewalls of the basket.

6. The shopping cart of claim 5, wherein the one or more lights are configured to illuminate a physical space above the upper perimeter of the sidewalls of the basket.

7. The shopping cart of claim 1, wherein at least one of the one or more lights are positioned along a rear portion of the basket opposite a front portion of the basket.

8. The shopping cart of claim 1, wherein the handle area comprises an opening that is positioned rearward of the handle.

9. The shopping cart of claim 8, wherein the opening is configured to receive a mobile computing device.

10. The shopping cart of claim 9, wherein the mobile computing device is logically paired to the controller and configured to present information about the virtual shopping cart as the controller identifies the items put into the cart.

11. The shopping cart of claim 9, wherein the mobile computing device is logically paired to the controller and the controller is configured to transmit, in real-time, a command to update information presented at the mobile computing device based on the identification of the items put into the cart.

12. The shopping cart of claim 1, wherein the shopping cart further comprises a mounted mobile computing device comprising a display that is configured to present information about the virtual shopping cart as the controller identifies the items put into the basket.

13. The shopping cart of claim 12, wherein the mounted mobile computing device is positioned between the handle of the shopping cart and the basket.

14. The shopping cart of claim 1, wherein the output signals cause the lights to be illuminated in a first color based on the controller positively identifying the items.

15. The shopping cart of claim 14, wherein the output signals cause the lights to be illuminated in a second color based on the controller determining that the items put into the basket are unidentifiable.

16. The shopping cart of claim 1, wherein the output signals cause the lights to be illuminated as a visual cue to the user indicating that the items put into the basket are positively identified by the controller and ready to be purchased by the user.

17. The shopping cart of claim 1, wherein the plurality of gesture sensors comprise one or more laser sensors.

18. The shopping cart of claim 1, wherein the one or more lights are positioned on the surface of the handle area above a plane defined by the upper perimeter of the sidewalls of the basket.

19. The shopping cart of claim 1, wherein the one or more lights have a generally circular shape.

20. The shopping cart of claim 1, wherein the one or more lights have a curved perimeter shape.

* * * * *